US012686427B1

(12) United States Patent (10) Patent No.: US 12,686,427 B1
Alameh et al. (45) Date of Patent: *\*Jul. 21, 2026

(54) CAPACITIVE SENSOR FOR ITEM IDENTIFYING MOBILE APPARATUS

(71) Applicant: Amazon Technologies, Inc., Seattle, WA (US)

(72) Inventors: Rachid M. Alameh, Crystal Lake, IL (US); Stephen Ernest O'Dea, Bedford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,273

(22) Filed: Aug. 26, 2024

Related U.S. Application Data

(63) Continuation of application No. 17/543,604, filed on Dec. 6, 2021, now Pat. No. 12,084,104.

(51) Int. Cl.
*G08B 13/14* (2006.01)
*B62B 3/14* (2006.01)
*G06Q 10/087* (2023.01)

(52) U.S. Cl.
CPC .......... *B62B 3/1488* (2013.01); *B62B 3/1472* (2013.01); *G06Q 10/087* (2013.01)

(58) Field of Classification Search
CPC .... B62B 3/1488; B62B 3/1472; G06Q 10/087
See application file for complete search history.

(56) References Cited

U.S. PATENT DOCUMENTS

| | | | |
|---|---|---|---|
| 8,371,504 B2 | 2/2013 | Connelly | |
| 9,117,106 B2 | 8/2015 | Dedeoglu | |
| 9,235,928 B2 | 1/2016 | Medioni | |
| 9,473,747 B2 | 10/2016 | Kobres | |
| 10,127,438 B1 | 11/2018 | Fisher | |
| 10,133,933 B1 | 11/2018 | Fisher | |
| 10,953,906 B1 * | 3/2021 | McMahon | B62B 3/1424 |
| 11,232,395 B1 * | 1/2022 | Crandall | G06Q 10/087 |
| 11,265,518 B2 | 3/2022 | Yones | |
| 11,820,414 B1 | 11/2023 | McMahon | |
| 11,884,315 B1 * | 1/2024 | Burch | B62B 3/1416 |
| 11,938,990 B1 | 3/2024 | Burch | |
| 12,084,104 B1 * | 9/2024 | Alameh | G06Q 10/087 |
| 12,187,539 B1 * | 1/2025 | Smith | G05B 15/02 |
| 2013/0284806 A1 | 10/2013 | Margalit | |
| 2023/0147769 A1 | 5/2023 | Hagen | |

* cited by examiner

*Primary Examiner* — Toan N Pham
(74) *Attorney, Agent, or Firm* — Kilpatrick Townsend & Stockton LLP

(57) ABSTRACT

This disclosure describes, in part, a mobile apparatus for identifying items within a facility using an omnidirectional imaging system. For instance, the mobile apparatus may include a main frame, a chassis attached to the main frame, a basket that attaches to the chassis in order to prevent the basket from contacting the main frame, and an omnidirectional imaging system providing image data in and around the mobile apparatus. A user may place item(s) within a receptacle of the basket. The mobile apparatus may further include a handlebar module attached to the main frame, the handlebar module including the omnidirectional imaging system and a computing system for identifying items and events in and around the cart.

20 Claims, 11 Drawing Sheets

HANDLEBAR MODULE
802

PROCESSOR(S)
804

COMMUNICATION
INTERFACE(S) 808

I/O INTERFACE(S)
806

CAPTURE ASSEMBLIES 810

SENSOR(S)
812

CAMERA(S) 814

LED(S) 816

POWER SUPPLY(IES) 818

BATTERY PACK MODULE
820

BATTERY(IES) 822

SECONDARY POWER
SUPPLY 824

DISPLAY
834

MICROPHONE(S)
826

LOUDSPEAKER(S)
828

SENSOR(S)
830

MEMORY
832

CART
800

1100

RECEIVE FIRST IMAGE DATA
1102

RECEIVE CAPACITIVE SENSOR DATA
1104

CAUSE AT LEAST ONE SETTING OF IMAGE
SENSOR TO CHANGE
1106

RECEIVE SECOND IMAGE DATA
1108

DETERMINE, USING THE SECOND IMAGE
DATA, AN ITEM IDENTIFICATION
1110

STORE AN ASSOCIATION BETWEEN THE ITEM
IDENTIFIER AND A LISTING OF PREVIOUSLY
STORED ITEM IDENTIFIERS FOR THE CART
1112

CAPACITIVE SENSOR FOR ITEM IDENTIFYING MOBILE APPARATUS

RELATED APPLICATIONS

This application is a continuation of U.S. application Ser. No. 17/543,604, filed Dec. 6, 2021, the entire contents of which is incorporated herein by reference and for all purposes.

BACKGROUND

Retail stores maintain an inventory of items in customer-accessible areas such that customers can pick items from the inventory for purchase, rental, and so forth. For example, a customer may take items from shelves located within the store and place the items in a shopping cart. When the customer is finished identifying and retrieving the items, the customer may transport the items, using the shopping cart, to a check-out destination within the store, such as a cashier or dedicated self-checkout stand. In some circumstances, the shopping cart may include sensors, such as cameras and weight sensors, that are configured to determine the items that are placed into the shopping cart by the customer. In these circumstances, the shopping cart may then update a list of items for the customer, display the list of items to the customer, and/or send the list of items to a system for processing of a transaction for the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
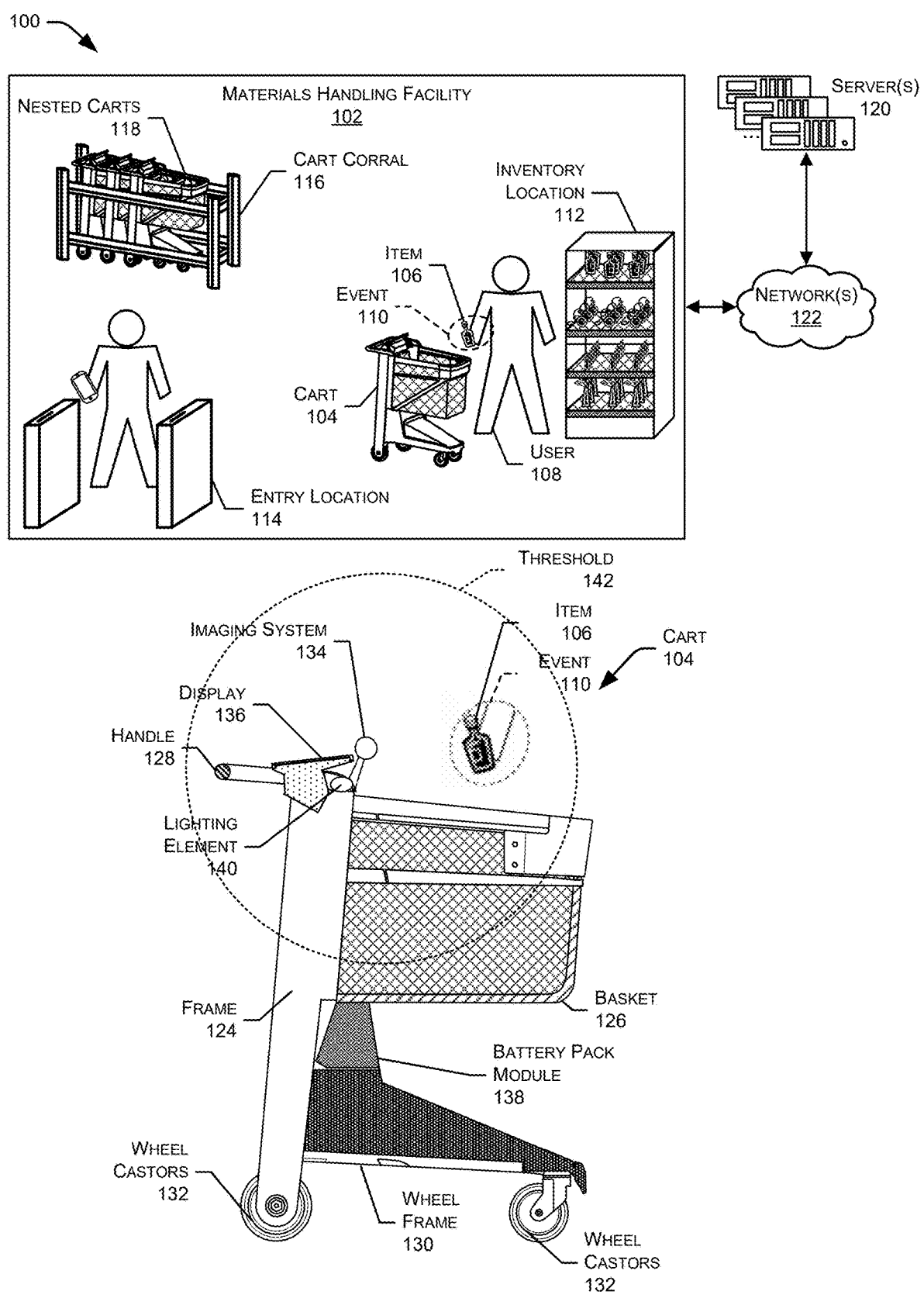
FIG. 1 illustrates an example environment of a materials handling facility that includes an item-identifying cart to identify items placed in, and removed from, a basket of the cart by a user, according to at least one example.

This disclosure is directed to item-identifying carts that may be utilized by users in material handling facilities to automatically identify items that the users place in their carts as they move around the material handling facilities, as well as to identify the users operating the carts. Upon identifying a user operating a cart and items placed into the cart, the item-identifying cart may update a virtual shopping cart of the user to represent the items that have been placed in, or removed from, the physical cart. According to the techniques described herein, an item-identifying cart may include one or more cameras positioned on a frame of the cart providing a view both in and around the cart. In some examples, the one or more cameras may include a barcode scanner or reader to identify a barcode or unique identifier off of an item. The one or more cameras may include one or more different focal lengths or settings, for example to gather image data at a first distance or a second distance, or at a first resolution or level of detail or at a second resolution or level of detail. The cameras or processors may consume additional power or resources when identifying items in image data, as such, high fidelity image data for item identification may be captured when items are brought to the cart. For example, a barcode scanner may consumer power at a high rate and reduce operating time for the cart before recharging is required. The one or more cameras may be connected to a sensor system, incorporated as part of the imaging system, that provides sensor data used by the cart to cause the cameras to change between the first setting and the second setting. In some examples, the sensor system detects a presence of an item adjacent or entering the cart or otherwise presented to the camera adjacent the basket and triggers the camera system to capture image data that may be used for item recognition. In some examples, the cameras may include an omnidirectional camera system that may be attached to the frame of the cart. The omnidirectional camera may be used to gather image data of the user pushing the cart, items placed in the cart, and the environment surrounding the cart. Though described in some examples including an omnidirectional camera, the camera system may not be an omnidirectional sensor but may be a directional camera or barcode scanner that does not provide an omnidirectional view. The sensor system may include a capacitive sensor that detects a presence of an item within a threshold distance of the sensor and/or cart. The cart may include components for associating the image data with the user, with one or more items, or with environment surrounding the cart. In some examples, the cart may send the image data to one or more remote servers for determining these associations.

The sensor system may include a capacitive sensor system that includes a conductive sphere, spheroid, or other shape that may gather capacitive data that is changed in response to a presence of an item within a threshold distance of the sensor. The capacitive sensor may include additional components, such as additional conductive layers, flex conductors, and other such elements that enable the capacitive sensor to compensate for temperature drift and other changes in an environment, such as the presence of a display or user adjacent the cart. The capacitive sensor relies on a change in capacitance, as detected by the conductive surface, rather than an absolute capacitance value. When the rate of change in capacitance reaches a threshold, because capacitance is based on a distance between objects, the change in capacitance is indicative of an object being within a threshold distance (e.g., within one foot or two feet) of the sensor system or the cart. The sensor system may, in some examples, be connected to a conductive frame or component of the cart and thereby detect when objects are within a threshold distance of the cart itself.

The cart may include one or more components that analyze the image data to determine an item identifier for the item(s) placed in the cart or removed from the cart, identify item(s) placed in the cart based on image identification, and update a virtual shopping cart for the user of the cart. Once a user has finished their shopping session, the user may be able to efficiently check-out of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include an imaging system with cameras having different settings for near-distance and far-distance data gathering and a capacitive sensor useful for identifying when an item is within a threshold distance and thereby cause the cameras to switch from a far-distance image gathering setting to a near-distance image gathering system. The cart may also include memory that stores software components for identifying users and/or items, identifying changes in capacitance and rate of change in capacitance from the capacitive sensor, and for performing other operations for managing virtual shopping carts, at least one processor to execute the software components, and at least one battery to power the components of the cart. The imaging system may include an omnidirectional camera with one or more wide angle lenses or fisheye lenses directed in a first direction and having a field of view of over one hundred and eighty degrees with a second wide angle lens directed in a second direction opposite the first such that the image devices may provide a view of an entire environment in and around the cart. The omnidirectional camera may be connected to the frame toward a location where a user would typically push the cart. The omnidirectional camera may be part of a camera system that captures image data at different settings, such as focal length or resolution. The camera system includes a presence sensor such as the capacitive sensor described herein that may be used to trigger the camera to switch between settings. The omnidirectional camera may generate image data, such as image data of a mobile phone of a user representing visual indicia (e.g., a barcode) associated with an account of the user, identifying items brought to the cart by the user, and identifying user interactions and environment away from the cart. At the first setting, the image data may be used to identify interactions and events remote from the cart, while at the second setting, the image data may be used for barcode scanning or other item identification at the proximity of the cart. The omnidirectional camera may generate a single view of the environment surrounding the cart and may implement one or more imaging devices to generate the single view of the surrounding environment. As mentioned previously, the omnidirectional camera may instead be a camera, imaging sensor, barcode scanner, or other such sensor system.

In some examples, the cart may have a frame around an upper perimeter of the basket or receptacle where the imaging system and capacitive sensor may be coupled such that the environment around the cart as well as the interior of the cart are visible to the omnidirectional camera. In some examples, the imaging system may include multiple camera devices as well as other components, such as the capacitive sensor, light sources (e.g., light emitting diodes (LEDs)) to activate and emit light on the items such that the items are illuminated in the image data to help improve processing of the image data to identify the items. In some examples, a single housing may enclose the cameras, capacitive sensor, and light sources. In other instances, the cameras, capacitive sensor, and light sources may be remote from one another Due to the battery life constraints of the cart, it may be advantageous in some examples to refrain from having the cameras and/or light sources operating for large periods of time to detect an image being placed in the cart, or capturing high resolution image data for item identification. Thus, the capacitive sensor may generate capacitive data to detect an item being brought within a threshold distance of the cart and/or sensor while the cameras and/or light sources are de-activated or in a low-power state. In this way, the capacitive sensor and processing of capacitive data, which may consume less power than the cameras and/or light sources, may detect an item being brought within a threshold distance before the cameras and/or light sources are activated or changed to an item identification setting. In some examples, the low-power state may still enable the camera to capture image data of the environment at a distance, while detailed or high-resolution data may be gathered when out of the low-power mode.

In some examples, the capacitive sensor may detect items at multiple thresholds for triggering different actions by the cart. In an example, a capacitive sensor may have three different threshold distances at which it may detect items. The thresholds may trigger different actions, with a first threshold distance at a first distance used to activate lighting associated with the camera, a second threshold at a second distance closer than the first distance may cause a barcode reader or camera to wake or enter an active mode, a third threshold at a third distance triggering item identification of the item via the camera or barcode scanner. In some examples, additional thresholds may be used to trigger other actions such as triggering of different cameras, triggering use of different focal lengths, and other actions associated with the cart.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or looking into the camera for facial recognition. Once a user has identified themselves to a smart cart, the user may begin a shopping session where the smart cart identifies, and tracks items retrieved by the user and placed in the smart cart.

The cart may operate with the cameras in a first mode, such as with a first focal length or first resolution until the capacitive sensor is used to detect an object being brought within a threshold distance of the cart. The capacitive sensor may generate sensor data that indicates whether an item or object is within a threshold range of distances from the cart (e.g., within 6 inches, within 1 foot, within 2 feet, etc.). The capacitive sensor may identify items presented to or brought near the capacitive sensor, in a motion similar to a checkout scanning action. For example, the item may be presented to a barcode scanner, with the capacitive sensor configured to trigger action by the barcode scanner and associated software to identify the item in response to the item being presented at the cart or otherwise brought within the threshold distance of the capacitive sensor. The sensor data may be analyzed to trigger the cameras, light sources, or other elements to change an operating state, setting, or switch to a different system (e.g., switch from a first focal length camera to a second focal length camera), begin illuminating light and the cameras to begin generating image data. The image data generated by the camera may be analyzed by the software components to determine whether or not an item is being placed in the cart or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to a particular item, the software components on the cart may store an indication that the item identifier was added to the cart, or removed from the cart, and update a virtual shopping cart accordingly.

Although some of the techniques described below are performed locally on the cart, in other examples, some or all of the techniques may be performed by one or more backend devices or servers associated with the facility. For instance, the capacitive sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session, and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the item-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility that includes an item-identifying cart to identify items placed in, and removed from, a basket of the cart by a user using an imaging system with a capacitive sensor, according to at least one example. The imaging system 134 may generate image data for identifying a user and depicting the item 106 as well as the environment surrounding the cart 104. In addition, the cart 104 may analyze the image data to identify an item identifier for the item 106, determine the event 110 involving the item (e.g., add to cart, remove from cart, multiple items, quantity of items, select from shelf, put back on shelf etc.) and update a virtual shopping cart and/or an event log associated with the identified user 108 using the item identifier.

As FIG. 1 depicts, the user 108 may have engaged in a shopping session in the materials handling facility 102. For instance, the user 108 may have selected an item 106 from an inventory location 112 (e.g., shelf, aisle, etc.) and placed the item 106 in the cart 104 (e.g., shopping cart). At the inventory location 112, the user is more than a threshold 142 distance from the cart and the imaging system 134 may capture image data of the surroundings to identify the items at the inventory location 112. As the item 106 is brought within the threshold 142, the imaging system 134 may change a setting or operating condition to change into an item identification setting to capture detailed image data within the proximity of the cart 104. The inventory location 112 may house one or more different types of items 106 and the user 108 may pick (i.e., take, retrieve, etc.) one of these items 106. Though the user 108 may select multiple items from a shelf without placing some or all in the cart 104, the imaging system 134 may identify the removal of multiple items and may generate an event log that may be used to identify and record interactions with the facility 102.

As illustrated, the materials handling facility 102 (or "facility") may have one or more entry locations 114, such as lanes. The entry location 114 may be defined by a gate in some examples and may include a movable barrier to control movement of users 108. For example, the gate may include computer-controlled panels that may be closed to impede passage of the users 108 or opened to permit passage of the user 108. Upon entering a facility 102, a user 108 may desire to utilize a cart 104 for their shopping session to transport items 106 around the facility 102 during their shopping session. In such examples, the user 108 may approach a cart corral 116, or other locations, at which carts are stored. In some examples, the cart corral 116 may comprise a structure, such as an aisle, for storing nested carts 118.

Generally, two or more of the carts may be configured to nest or otherwise functionality join with one another, so that the carts may be easily stored in a cart corral 116, and/or transported in bulk. The imaging system 134 may not prevent the nesting of the carts while still providing views in and around the cart 104. In some examples, the cart corral 116 may provide additional functionality beyond storage. For instance, the cart corral 116 may facilitate charging of the nested carts 118 that are in the cart corral 116. For instance, the cart corral 116 may have various electrical contacts extending along the length of a horizontal and/or vertical member of the corral 116 that, when placed in electrical contact with an electrical contact of the nested carts 118, charge one or more batteries of the nested carts 118. In other examples, power cords may extend from the cart corral 116 that may be plugged into the nested carts 118 to recharge batteries of the nested carts 118 while not in use.

To utilize a cart 104, a user 108 may approach an unused cart that is not currently engaged in a shopping session (e.g., a nested cart 118), and interact with the unused cart 104 to identify themselves to the cart 104 and begin a shopping session. For instance, the imaging system 134, which may include one or more imaging devices (e.g., an image sensor such as a camera, photodetector array, thermal IR imaging, or other sensing apparatus designed to read a one or two-dimensional barcode) such that when a user 108 presents a user device, or portion thereof, such as the display, to the imaging system 134, the cart 104 may identify the user and corresponding user account for a shopping session. In some examples, a capacitive sensor within the imaging system 134 may identify a user approaching the cart 104 and change an operating state of the cart to initiate a shopping session for the user. Other types of interaction may be performed by a user 108 to identify themselves to a cart 104 (e.g., uttering a name or other keyword to identify the user 108, presenting the user's face for facial recognition, typing in a password or other user information into a display of the cart 104, and/or any other type of user identification technique).

Once a user has identified themselves to the cart 104, the item-identifying functionality of the cart 104 may be activated such that subsequent items 106 viewed, selected, and/or placed in the cart 104 will be identified by the cart 104 and added to a virtual shopping cart for the user 108 and/or the event log. As illustrated, a user 108 may move the cart 104 around the facility 102 to one or more inventory locations 112. The user 108 may retrieve items from the inventory location 112 and place the items 106 in the cart 104. As items are removed, the imaging system 134 may gather image data and record in the event log events indicative of the interaction. As detailed above, the imaging system 134 includes parameters for gathering image data at a distance from the cart and a separate set of parameters for gathering data at or in the cart 104. While the user is interacting with inventory locations 112, the imaging system 134 may gather image data and event details of the interaction using the first parameters. In some examples, the cart

104 may cause the imaging system 134 to enter a low-power mode with the camera system 134 reducing image data gathering or other sensor data gathering. Additionally, the user 108 may retrieve items 106 from the cart 104 and put the items 106 back in an inventory location 112, such as when the user 108 changes their mind regarding their desire to purchase or otherwise acquire the item 106. The cart 104 may include various components for identifying item identifiers corresponding to the items 106 placed in the cart and maintaining a virtual shopping cart and event log for the shopping session of the user 108.

Figure 2:
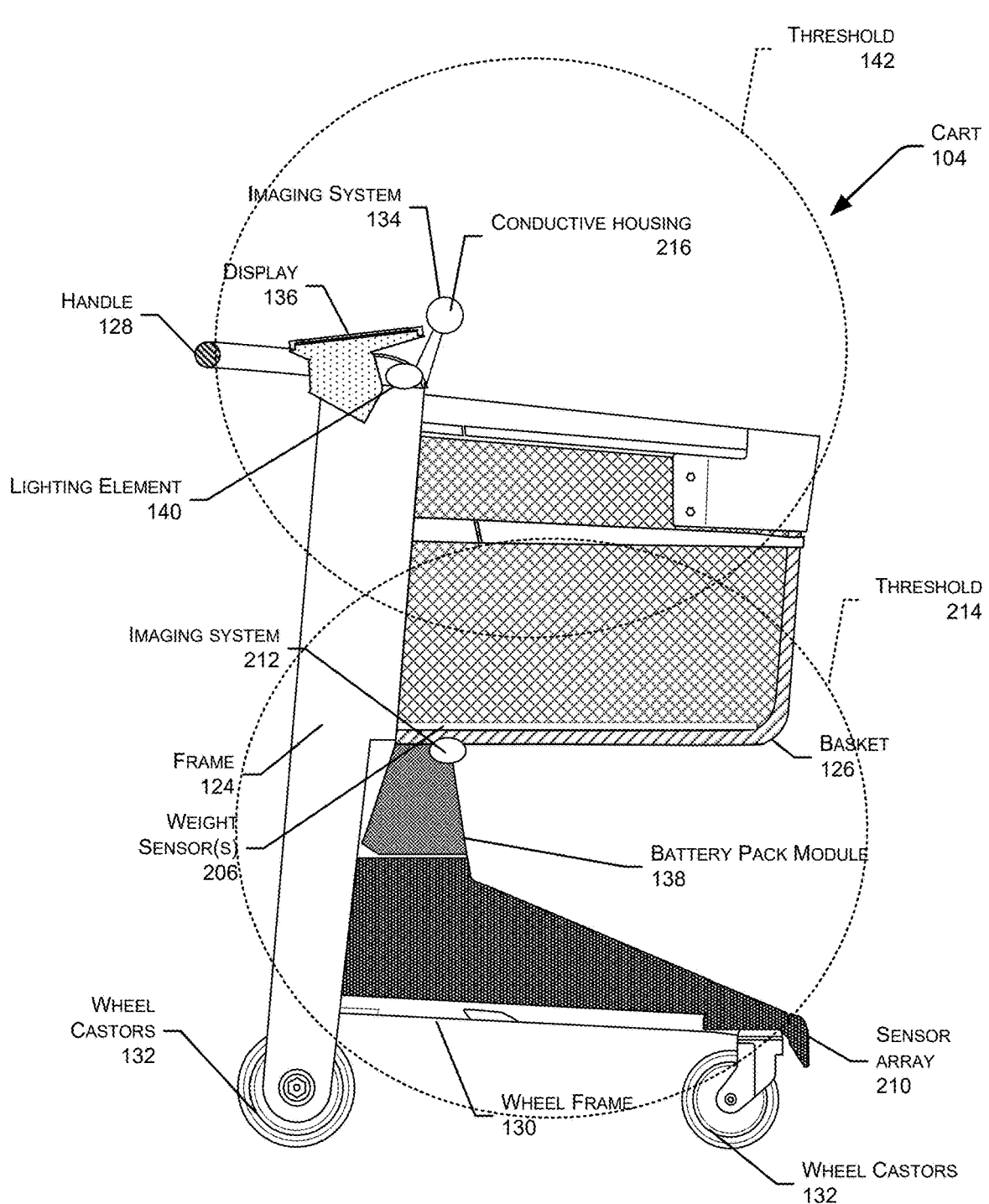
FIG. 2 illustrates the cart of FIG. 1 in further detail, according to at least one example.

In some examples, the cart 104 may include additional sensors, such as sensor array 210 of FIG. 2 or other sensors, can be used with data from the capacitive sensors to enhance a confidence level of an item being brought within the threshold. In some examples, the additional data may include data from an accelerometer or localization sensor (e.g., GPS or other localization systems). The additional sensor data may be used to increase the confidence level of the capacitance data. For example, using a capacitive sensor and one or more additional sensors the cart may identify when it is nested with other carts. A capacitive sensor of a first cart 104 will detect when in close proximity of a second cart, for example when nested. The accelerometer data may be used to determine whether a cart is nested with other carts. In such examples, the capacitance data may increase when brought near the second cart but remain constant due to the nesting. The accelerometer data may indicate that the cart 104 is stationary which may be used in combination with the constant capacitance data to determine that the cart 104 is nested with a second cart by confirming nested carts are stationary and not moving. In some examples, the additional data may include localization data indicating a location such as through a localization system or camera directed at one or more markers indicating a position within the facility.

Once the user 108 has finished their shopping session, the user 108 may end the shopping session in various ways. For instance, the user 108 may return the cart 104 to the cart corral 116, provide input to the cart 104 indicating an end of the shopping session (e.g., utterance, utilize a user interface element on a touch display, etc.), or simply remove item bags or other item carriers from the cart 104 and leave the facility 102. After the user 108 has ended their shopping session, the list of item identifiers in the virtual shopping cart may be uploaded to one or more remote servers 120, over one or more networks 122, that manage user accounts for users 108 of the facility 102. In some examples, the event log may be compared against the virtual cart to verify that the virtual cart includes all items selected by the user except for items returned to the shelves. In this manner, the cart may provide a theft detection system and/or verification for audit of the virtual cart. The server(s) 120 may charge the appropriate user account for the listing of the items in the virtual shopping cart that the user took from the facility 102. For instance, the server(s) 120 may be configured to determine or generate information indicative of a cost of the items 106 picked by the user 108. Additionally, the server(s) 120 may store payment information (e.g., credit card information, bank account information, etc.) for each user account. In this way, when the user 108 finished their shopping session and the cart 104 sends the listing of item identifiers in the virtual shopping cart over the network(s) 122 to the server(s) 120, the server(s) 120 may be configured to determine a cost or price for all of the listed item identifiers, and charge the user via their payment information for the items 106 selected during their shopping session. In this way, the user 108 need not go through steps of a traditional check-out experience (e.g., waiting in line for a cashier, scanning items with the cashier, paying for items at the cashier, etc.).

The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The cart 104 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers 120 may perform some or all of the operations described below as being performed by the cart 104. While the servers 120 are illustrated as being in a location outside of the facility 102, in other implementations, at least a portion of the servers 120 may be located at the facility 102.

As illustrated, the cart 104 may generally include or be formed of a frame 124, a basket 126, a handle 128 for pushing the cart 104, a wheel frame 130, and one or more wheel castors 132 to enable movement of the cart 104 on a surface. The frame 124, the basket 126, the handle 128, and the wheel frame 130 may be formed from any suitable materials such as plastics, wood, metals, composites, or any other combinations of materials. Moreover, frame 124, the basket 126, the handle 128, and the wheel frame 130 may take any form.

The basket 126 may generally be part of the frame 124 and/or supported by the frame 124 (e.g., be welded, fused, adhered, bolted, screwed, molded, or otherwise joined to the frame 124). In some examples, the basket 126 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The grid structure of the basket 126 may allow the omnidirectional imaging system 134 to view items placed on a lower portion of the cart 104. The basket 126 may generally be any shape that defines an interior cavity, or receptacle, for receiving items 106 that are placed in the cart 104. The basket 126 may comprise a bottom, multiple sides protruding from the bottom, and a top. As illustrated, the bottom basket 126 may be in the shape of a quadrilateral such that there are four sides protruding from the bottom of the basket 126. Similarly, the top of the basket 126 may be defined according to the quadrilateral shape and have a perimeter with four corners. The perimeter of the top of the basket 126 may define an opening to the interior cavity (or receptacle) of the basket 126 to receive items placed inside the basket 126. In various examples, the perimeter of the top of the basket may be disposed in a substantially horizontal plane (e.g., a plane substantially parallel with a support surface), and the frame

124 may include at least one vertical member that extends downward from the basket 126 to the wheel frame 130 along a substantially vertical plane (e.g., a plane substantially along the y-axis as illustrated). In some examples, the basket 126 may be formed of a low-conductivity material such as a plastic that may not have a conductivity as high as a metal or other such material while in other examples the basket 126 may be formed of conductive materials such as metals. Conductive materials may be used to extend a range of the capacitive sensor, for example by being connected to the capacitive sensor. In some examples, the conductive materials may be used to detect a user's hands placed on the cart 104 and thereby indicate use of the cart 104. Low conductivity basket material 126 may be used in conjunction with a conductive material, such as a conductive paint or other conductive material applied to or connected to the basket. In a low-conductive basket 126, the contact with a human may be active when contacted, though to a lesser degree than a conductive material and may still therefore be used to identify user interactions and hands placed on the basket 126.

The wheel frame 130 may support one or more-wheel castors 132 to enable movement of the cart 104 along a surface. The wheel casters 132 include one or more wheels, axles, forks, joints, or other components which enable the cart 104 to travel on various surfaces. For example, in some implementations each of the wheel casters 132 may include a single wheel provided on an axle within a fork, or two or more wheels provided on such an axle. In some other implementations, the wheel casters 132 may include two or more axles. Alternatively, in still other implementations, a single caster may be provided in lieu of the multiple wheel casters 132 shown in FIG. 1. In accordance with the present disclosure, the wheel casters 132 may operate in any manner, such as being configured to pivot or swivel, and thus automatically adjust or align with a direction of travel. In some examples, the cart 104 may be equipped with other apparatuses for enabling the cart 104 to travel on solid surfaces, including one or more wheeled components other than casters, including but not limited to omnidirectional wheels, spherical wheels, or other like apparatuses. Additionally, in some other implementations, the cart 104 may include two or more skis or other runners for traveling on smooth surfaces. In still other implementations, the cart 104 may be levitated, e.g., by magnetic levitation through the use of one or more linear induction motors. Moreover, the cart 104 may be propelled or pushed by humans or autonomous mobile robots or, alternatively, by one or more motors (e.g., electric-powered, or gasoline-powered).

As illustrated, the cart 104 may include an imaging system 134 for identifying a user operating the cart as described above, identifying items placed in the basket 126 and removed from the basket 126, identifying items brought within a threshold 142 of the cart 104, and identifying events and interactions outside of and adjacent to the cart 104. The imaging system 134 may, in some instances, be positioned in a manner such that an FOV of the imaging system 134 includes a three-hundred-and-sixty-degree view around the cart 104. In some examples, the FOV may be less than three hundred and sixty degrees, such as two hundred and seventy degrees, with a portion of the FOV blocked, for example the portion facing the user or directed directly upwards or downwards towards the ceiling or floor of the facility 102. The imaging system 134 may provide an omnidirectional view by providing a single view of the surrounding environment around the cart 104. In some examples, the imaging system may include image data covering nearly three hundred and sixty degrees around the cart 104. In some examples, the imaging system 134 may not provide a view of the entire surroundings, for example, excluding where occluded by the display 136, and may not include image data showing an area directly above or below the cart 104. The imaging system 134 may be positioned at any location on the cart 104 (e.g., in the basket 126, on the basket 126, mounted to the frame 124, mounted to the basket 126, and/or any other location), oriented to have respective FOVs for identifying events that occur within and proximate to the cart 104. In some examples, the imaging system 134 may be augmented by one or more additional sensors, including a barcode scanner or a proximity sensor that may be used to item identification as items are brough into the basket 126.

The imaging system 134 includes a capacitive sensor that may be used to identify when items are brought in proximity of the cart 104 and cause the imaging system 134 or other systems of the cart 104 to change operating states, parameters, or conditions to change between focal lengths, power modes, resolution, illumination modes, and other such settings. The capacitive sensor in included with the imaging system 134 by being part of a conductive housing or conductive layer of a housing surrounding the cameras of the imaging system 134. When the cart 104 identifies a rate of change of capacitance to determine when one or more items are within the threshold 142 of the cart 104 and cause the cart 104 to change operating modes to focus resources on item identification at or adjacent the cart 104 rather than at a distance from the cart 104.

In some examples, the cart 104 may further include one or more one lighting elements 140 (e.g., LED) for emitting light at or in response to a detection of an item being placed in the cart 104. The lighting element 140 may be triggered by a proximity sensor, such as the capacitive sensor of the imaging system 134 or based on the image data from the imaging system 134. The cart 104 may further include, in some instances, one or more proximity sensors (e.g., ToF sensor, PIR sensor, etc.). In some examples the proximity sensors may be activated to detect the proximity of items 106 or other objects above the top of the basket 126 in addition to the capacitive sensor. The proximity sensors may be configured to generate sensor data that indicates distances between objects above the top of the basket 126 of the cart 104 and the second imaging devices. The cart 104 may include components configured to analyze the sensor data and determine that an item 106 is within some threshold distance from the top of the basket 126 and/or within the basket 126. Upon detecting an object within the threshold 142 proximity of the basket 126 using the capacitive sensor and/or the proximity sensor, one or more components of the cart 104 may cause the lighting element 140 (LEDs) to emit light and cause the imaging system 134 to generate image data of an illuminated item identifier. In some examples, the FOVs of the image devices forming the imaging system 134 may each at least partially overlap. The lighting element 140 may illuminate the basket 126 and/or the area above the top of the basket 126 to illuminate items 106 being placed in the cart 104, or removed from the cart 104, to act as a "flash" for the camera generating image data. The imaging system 134 may generate image data for a predefined period of time and/or until the capacitive sensor, proximity sensors (or the image data itself) indicates that there is no longer an object within the threshold distance from the cart 104 or top of the cart 104 or the item is no longer moving relative to the cart 104.

After generating the image data, one or more components of the cart 104 may process the image data to determine an item identifier for the item(s) 106 represented in the image data, and an event 110 for the image data (e.g., addition of an item 106 to the cart, removal of an item 106 from the cart, interaction on a shelf, view on a shelf, replace on a shelf, etc.). As described in more detail below, the cart 104 may include component(s) to determine an item 106 identifier for the item 106 (e.g., name of the item 106, SKU number for the item 106, image recognition, etc.), and determine if the item 106 is being taken from the cart 104, added to the cart 104, removed from a shelf, replaced on a shelf, or other events based on the motion of the item 106 and the result of the movement around the cart 104 once movement is no longer detected and represented by the image data. The components of the cart 104 may then update a virtual shopping cart and/or an event log associated with the cart 104 that indicates a virtual listing of items 106 taken by the user 108 from the facility based on the determined event 110. In some examples, the image data may be transmitted to the server(s) 120 over the network(s) 122 where the processing may be performed.

In various examples, the cart 104 may include a display 136 to present various information in user interface(s) for the user 108 to consume. In some examples, the display 136 may comprise a touch screen to receive input from the user 108 (e.g., a selection of an item identifier to disambiguate amongst potential item identifiers). In some instances, the display 136 may present customized information to the user 108 upon identifying the user 108, such as a shopping list of the user or the like.

The cart 104 may further include a battery pack module 138 that houses one or more batteries to power the components of the cart 104. The battery pack module 138 may include rechargeable batteries. In some examples, the battery pack module 138 may be detachably coupled to the wheel frame 130 and/or the frame 124 of the cart 104 such that the battery pack module 138 may be removed and taken to a charging station. In various examples, the battery pack module 138 may include rechargeable batteries that may be charged when the cart 104 is placed in a cart corral 116 (e.g., through electrical contacts, power cords, etc.). In various examples, the frame 124 and/or basket 126 may have one or more channels (e.g., grooves, holes, paths, tunnels, etc.) through which power cables/cords may pass. In this way, power cables may be run at least partially through the channels in the frame 124 and/or basket 126 inconspicuously to provide power to the various components of the cart 104.

In some instances, the cart 104 may further include one or more lighting elements 140 disposed on the frame 124 and/or basket 126 of the cart 104 as discussed above for providing a flash or additional lighting during image generation. The user 108 may, in some instances, operate a controller to turn on (and off) the lighting element(s) 140 to cause the lighting element(s) 140 to emit light. Further, in some instances the controller may enable the lighting element(s) 140 to transition between multiple light states, such as different colors, flashing effects, and/or the like. The controller operable by the user 108 may comprise functionality accessible to the user 108 via the display (e.g., one or more soft buttons for turning on and/or off the light), a physical toggle switch on the frame 124 of the cart 104, and/or the light. Further, the lighting element(s) 140 may be used to signal a predefined state of the cart 104 and/or the user 108. For example, the user 108 may turn on the lighting element(s) 140 to indicate that he or she requests assistance from an associate of the facility 102, or for any other reason. In some instances, in response to the user 108 operating a controller to request assistance, the cart 104 may perform one or more actions in addition to turning on the lighting element(s) 140. For example, the display may present content responding to this request, such as an offer to connect the user 108 with an associate of the store (e.g., in person, via I/O devices of the cart, etc.). For example, in response to requesting assistance, the cart 104 may facilitate an audio-only or an audio/video call between the user 108 and an associate of the facility using one or more I/O devices on the cart, such as the display, one or more speakers, one or more microphones, one or more cameras pointed toward the user 108 and/or the like.

FIG. 2 illustrates the cart 104 of FIG. 1 in further detail. As illustrated, the cart 104 may include the imaging system 134 for identifying a user, for identifying items placed into or removed from the basket 126, and for gathering image data for events in and around the cart 104, the display 136 for presenting information to a user operating the cart 104, and the one or more lighting elements 140. The imaging system 134 is illustrated with a conductive housing 216 that serves as part of a capacitive sensor to identify items brought within the threshold 142 of the cart 104. The conductive housing 216 may enclose the cameras and one or more components of the imaging system 134. In some examples, the conductive housing 216, which may be a capacitive sensor, may be remote from the imaging system 134. In some examples, the frame of the cart 104 may be conductive and may serve as a capacitive sensor.

In addition, the basket 126 may include one or more weight sensors 206 for determining a current weight of items placed in the basket 126. For example, the weight sensor 206 may comprise a strain gauge or other sensor that continuously or periodically may be used to determine a weight of items placed in the basket 126 and/or whether a change in weight has occurred.

This weight data may be used to identify when items have been placed into or removed from the basket 126 and, in some instances, may be used to identify items placed into or removed from the basket 126 or verify an identity of an item. For example, the weight data may be used to determine the identity of an item placed into or removed from the basket (e.g., to identify that a bottle of ketchup was placed into the basket and verify that the weight of the ketchup matches with the weight determined), identify a number of instances of an item (e.g., a number of bottles of ketchup placed into the basket), to measure an amount of something (e.g. 1 pound of peanuts), and/or the like.

In some examples, the cart 104 may include a second imaging system 212 positioned beneath the basket 126. The second imaging system 212 may be positioned and configured to capture image data representative of a lower shelf and wheel frame 130 of the cart 104. Items placed on the lower shelf may be detected and scanned using the second imaging system 212. In this manner, objects that may be too heavy to easily lift into the basket 126 may be placed underneath and still accounted for by the system.

FIG. 2 further illustrates that the cart 104 may include a sensor array 210, which may be used for determining a location of the cart 104 within the facility 102 or gathering data while the cart 104 is in use. In some instances, the sensor array 210 may include RFID sensors, proximity sensors, imaging devices, and other such sensors. In some instances, the cart 104, or a remote system communicatively coupled to the cart 104, may store map data that indicates associations between respective location with the facility to respective items detectable by the sensor array 210 throughout the facility. As illustrated, in some instances the sensor array 210 may reside near a bottom portion of the frame of the cart 104. In other instances, however, the sensor array 210 may reside at other locations on the cart 104 and/or distributed at multiple locations on the cart 104. In some examples, the location of the cart 104 may be determined based on image data from the imaging system 134 identifying markers or items within the facility 102.

In some examples the cart 104 may include a second imaging system 212 that may be similar to the imaging system 134 and may be positioned under the basket 126 to identify items brought to or placed under the basket 126. The second imaging system 212 may also include a capacitive sensor to identify items brought within a threshold 214.

Figure 3:
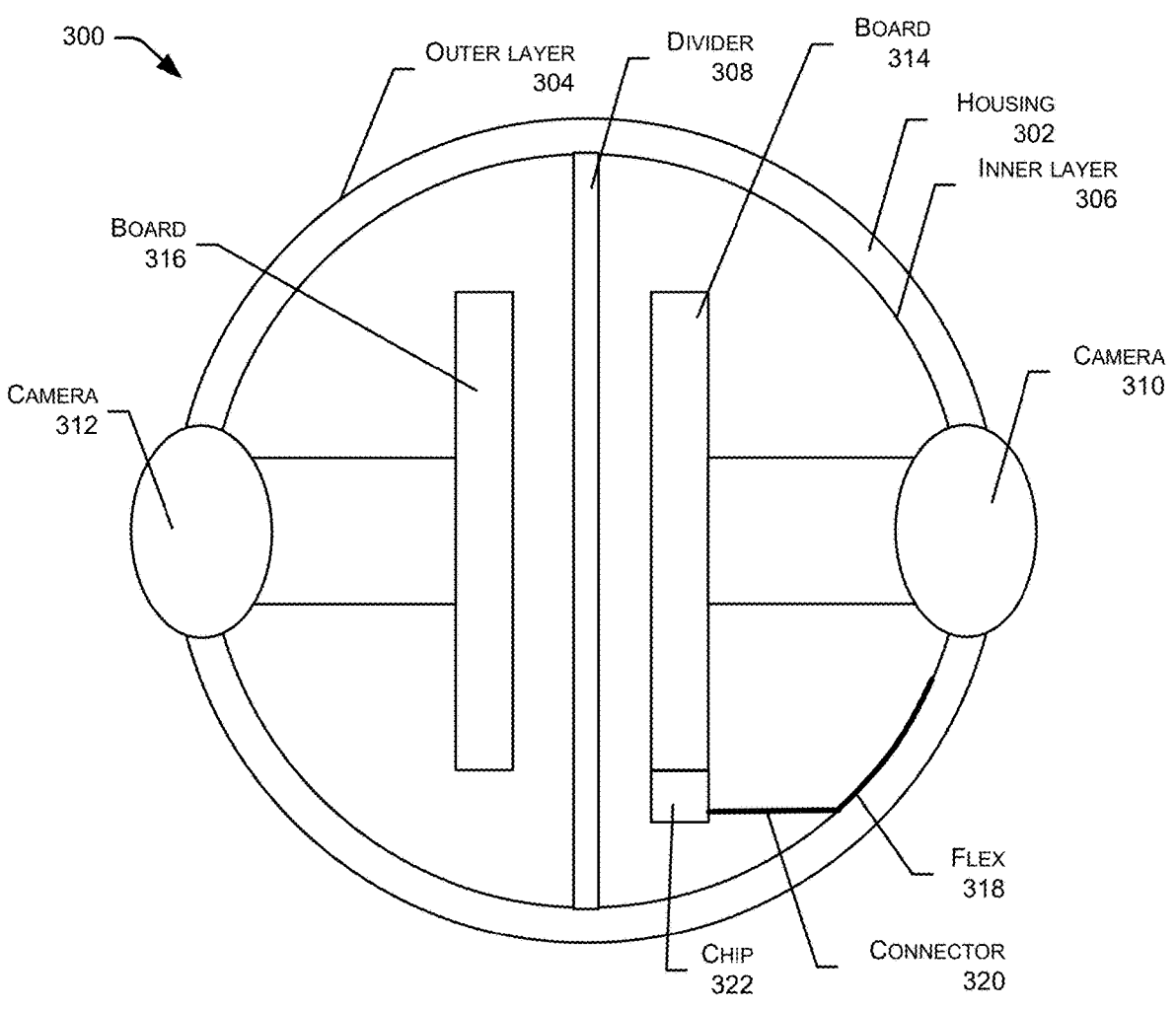
FIG. 3 illustrates a section view of an imaging system for an item-identifying cart, according to at least one example.

FIG. 3 illustrates a section view of an imaging system 300 for an item-identifying cart, according to at least one example. The imaging system 300 may be an example of the imaging system 134 of FIGS. 1 and 2. The imaging system 300 includes cameras 310 and 312 and with corresponding boards 314 and 316 that house components for operating the cameras 310 and 312 and gathering image data therefrom. The boards 314 and 316 may be connected to a housing 302 of the imaging system 300 such as at the divider 308. The cameras 310 and 312 include different settings or parameters, such as resolutions or focal lengths used for capturing image data at different distances or in different modes (e.g., a low power mode or an operating mode). The cameras 310 and 312 may be part of an omnidirectional camera system that captures image data of a surrounding environment around the cart 104.

The imaging system 300 is enclosed within a housing 302 that is shown with a sphere shape. In some examples, the housing 302 may have a spheroid shape or other shape that encloses the cameras 310 and 312 and related components. The housing 302 may be formed of a rigid material such as a metal or plastic material. In some examples, the housing 302 may include multiple different materials, such as a plastic housing 302 with an outer layer 304 and/or an inner layer 306 that is formed of a conductive material. The conductive layers, and/or the housing 302 (when formed of a conductive material) serves as a capacitive sensor. The capacitive sensor can detect an item in the proximity of the housing 302 based on the item having a different dielectric constant than air. In some examples, the housing 302 may be formed of a conductive material such as stainless steel or aluminum, or other conductive materials when used as a single layer capacitive sensor. In some examples, the housing 302 may be formed of a low-conductive material such as a thermoplastic. The inner layer 306 and outer layer 304 may be formed of a conductive material, such as a metal layer applied to the housing 302. The inner layer 306 and outer layer 304 may be formed of a sheet of conductive material formed to the shape of the housing 302 or may include a conductive paint applied to the interior or exterior of the housing 302.

The conductive layers of the housing 302 are coupled to the chip 322 where capacitive data is gathered and communicated to one or more processors, such as a processor of the cart 104 or a remote computing device, through a flex 318 and a connector 320. The flex conductor may couple to the inner layer 306 of the housing 302 to provide electrical coupling to the chip 322.

In some examples, the imaging system 300 may include multiple conductive layers, such as the inner layer 306 and the outer layer 304. The multiple layers may be used for compensating for temperature changes or temperature drift or drift in capacitance of the capacitive sensor. In an example, the inner layer 306 acts as a first capacitive sensor and the outer layer 304 as a second capacitive sensor. Each of the first and second capacitive sensors may gather capacitive data. Because the inner layer 306 is entirely enclosed within the outer layer 304, the capacitance detected by the inner layer 306 will only adjust due to changes in temperature. The outer layer 304 meanwhile will reflect changes in capacitance in the surrounding environment, including temperature drift of the sensor as well as shopper or item presence. The inner layer 306 is shielded from the outside by the outer layer, which may be temporarily driven as a shield via a software control, and the outer layer 304 may be momentarily turned to ground via software (e.g., software ground). In such examples, both the inner layer 306 and the outer layer 304 are impacted by changes to the environment but only the outer layer 304 identifies or detects a shopper or item. When the inner layer 306 is subtracted, the remainder is a capacitance change of the outer layer 304 only due to the shopper or item and is not altered by changing environment conditions such as temperatures In some examples, the housing 302 may include more than two layers of a capacitive sensor, such as three, or four layers of conductive material that may serve as capacitive sensors. In an example with three layers, a first outermost layer may collect sensor data of an environment, including temperature data, humidity, and item or shopper identity. A second layer positioned beneath the outermost layer may be used for temperature compensation as described above. A third layer may be positioned beneath the first and second layers and may be used as a ground to minimize interference from the cart frame. In an example with four layers, in addition to the first and second layers described above, separate layers may be included for shield (software shield), and ground (actual ground or software ground).

In some cases, such as when housing 302 is a single conductive layer, temperature drift of the capacitive sensor may be compensated for by adjusting for drift and changes in capacitance over a period of time via software to calibrate. For example, a slow change in capacitance over a period of time without crossing threshold is automatically reset to eliminate slow drift. If the capacitance change crosses threshold, it becomes valid detection and it is not considered drift, so reset will not be triggered.

Figure 4:
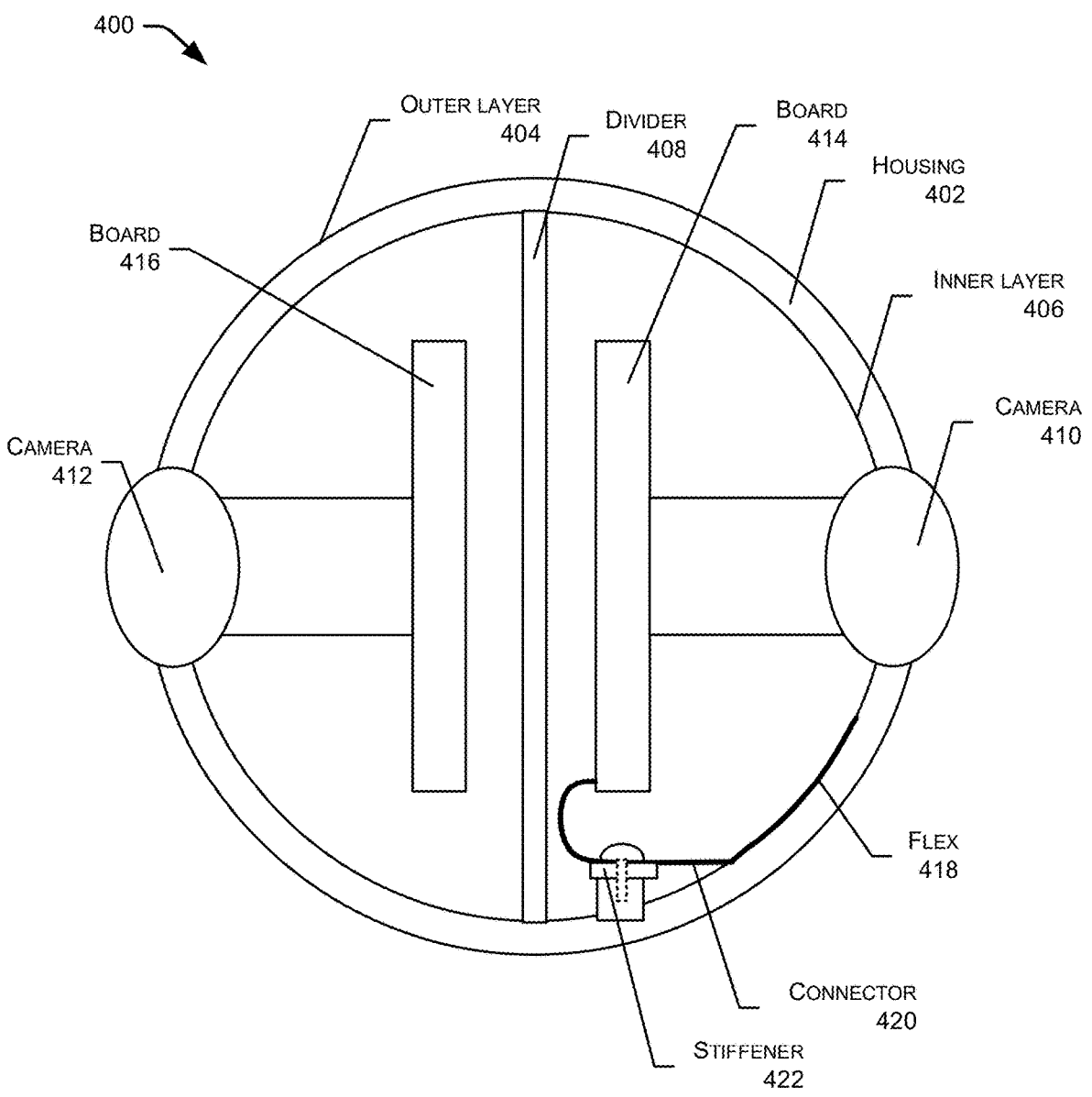
FIG. 4 illustrates a section view of an imaging system for an item-identifying cart, according to at least one example.

FIG. 4 illustrates a section view of an imaging system 400 for an item-identifying cart, according to at least one example. The imaging system 400 may be an example of the imaging system 134 of FIGS. 1 and 2. The imaging system 400 may include components similar to the imaging system 300 of FIG. 3. For example, the housing 402, outer layer 404, inner layer 406, divider 408, camera 410, camera 412, and board 416 may be the same as the housing 302, outer layer 304, inner layer 306, divider 308, camera 310, camera 312, and board 316. The board 414 may include the components of chip 322 for sensing capacitance data from the housing 402, outer layer 404, and/or inner layer 406. The flex 418 may couple to the housing and connect to the board 414 through the connector 420 that is made rigid and robust through the use of a stiffener 422.

Figure 5:
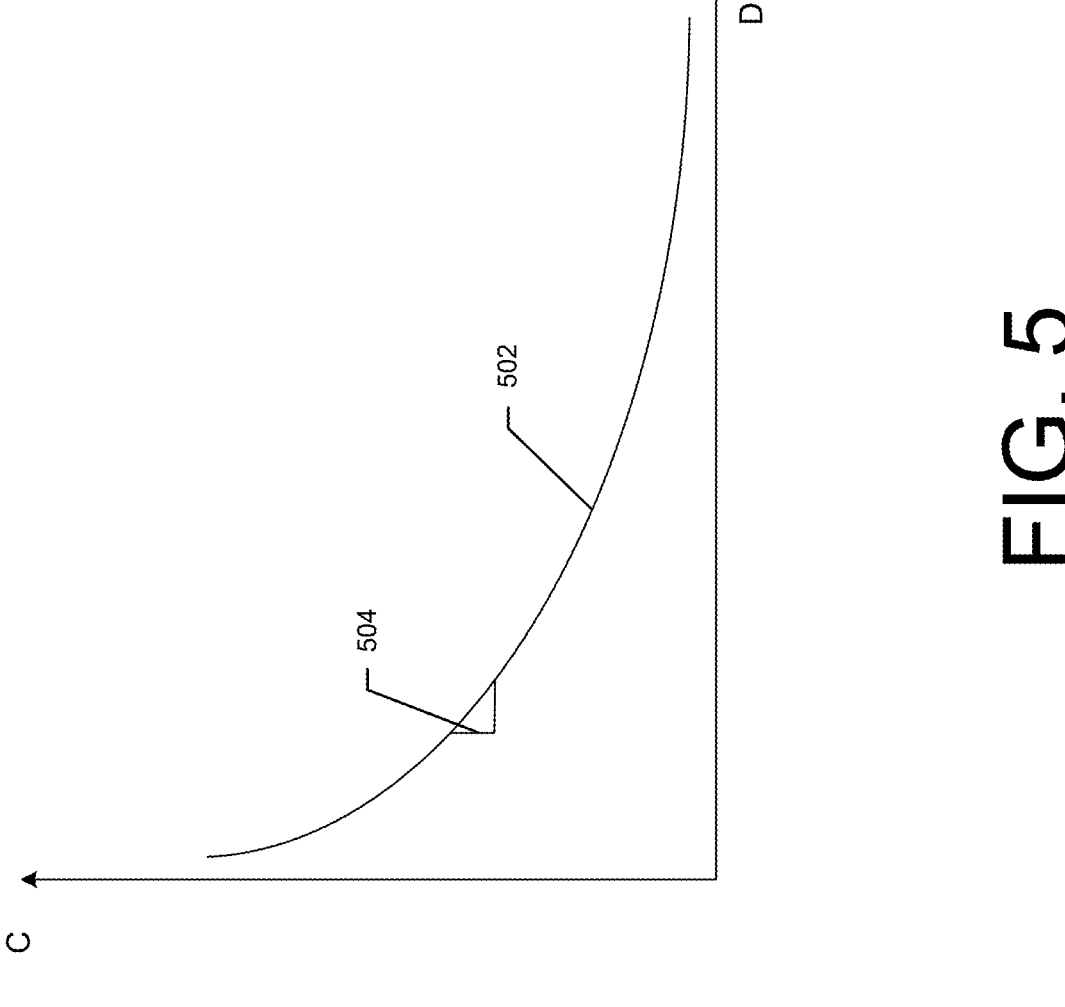
FIG. 5 illustrates a chart illustrating an example of capacitance data as a function of distance, according to at least one example.

FIG. 5 illustrates a chart 500 illustrating an example of capacitance data 502 as a function of distance, according to at least one example. The capacitance data 502 is shown with a vertical axis showing capacitance ("C") while a horizontal axis is shown reflecting distance ("D"). The capacitance is shown as a function of distance, with the capacitance data 502 decreasing exponentially as the distance increases. The capacitance may be similar to a parallel plate capacitance and modeled as $C=\varepsilon A/D$. The capacitance results in the hyperbolic curve of FIG. 5 when plotted as a function of distance. As described herein, the capacitive sensor of the imaging system 134 collects capacitance data that changes as objects are brought nearer to the cart 104, with the capacitance data 502 increasing as the objects come nearer to one another. The slope 504 of the capacitance data 502 may be used to identify the rate of change in capacitance. In some examples, the cart 104 may determine the rate of change of the capacitance data, based on the slope 504 of capacitance, with a particular slope 504 set for a threshold distance from the sensor. The threshold may be predetermined based on a predetermined change of capacitance based on an item coming within a predetermined distance, such as within one foot, within two feet, or other such distances. The rate of change for a given item increases as item approaches, following the asymptotic shape of the curve for capacitance data 502 that approaches vertical (e.g., a high rate of change) as the distance decreases. The slope of the capacitance data 502 is an indication of how close the item is regardless of its size of capacitance. Because different items have different capacitances, but all follow the capacitance curve, the slope may be used to determine rough distance to an item independent of item size.

Figure 6:
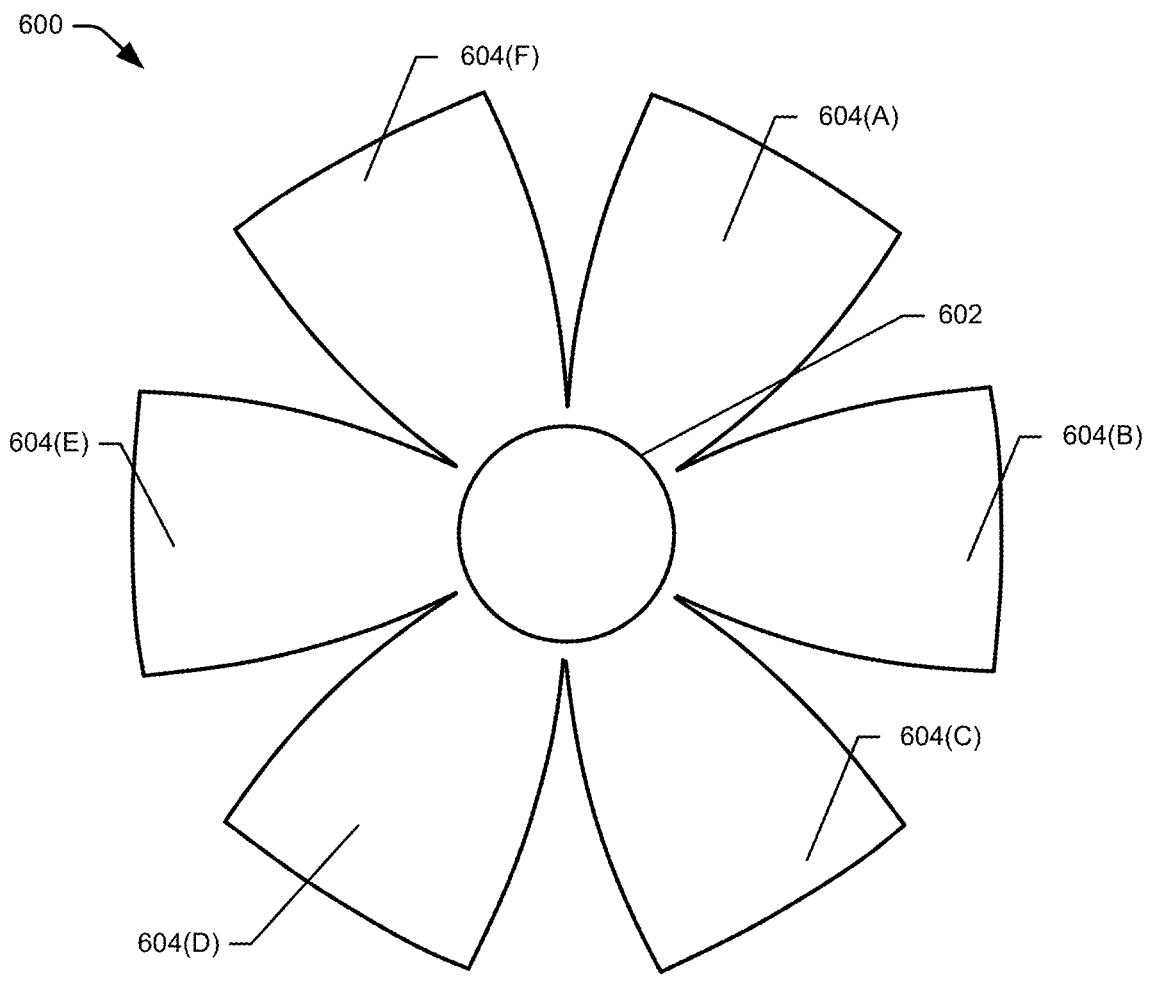
FIG. 6 illustrates an example layout of a foldable shape to form a capacitive sensor, according to at least one example.

FIG. 6 illustrates an example layout of a foldable shape 600 to form a capacitive sensor, according to at least one example. In some examples, the imaging system 134 includes a housing 216 that may be formed of a conductive material or may include an inner our outer layer of conductive material. The conductive material may include a conductive paint as described above or may include a conductive material such as a metal. In some example, the housing, or a layer thereof, may be formed by bending or folding a sheet into a hemisphere or other such chape that may be used to enclose the items within the housing. As shown in FIG. 6, a foldable shape 600 may be stamped or cut from a conductive material, such as a sheet of stainless steel. The foldable shape 600 may be bent into a hemispherical shape that may be combined with a second hemispherical shape to form the housing and/or the capacitive sensor. The foldable shape 600 includes six petals 604(A) . . . 604(F) (collectively petals 604) surrounding an aperture 602. The aperture 602 may provide an opening for a camera of the imaging system to capture image data of the surrounding environment. The petals 604 may each be bent or folded such that the edges of adjacent petals 604 contact one another to form a roughly hemispherical shape. In some examples, the foldable shape 600 may have more or less than six petals, with additional petals increasing the complexity while also increasing the adherence to a spheroid shape. In some examples, rather than a hemisphere, the housing may be formed in other geometric or non-geometric shapes, with housing formed by folding, bending, stamping, cutting, and otherwise shaping a conductive material.

Figure 7:
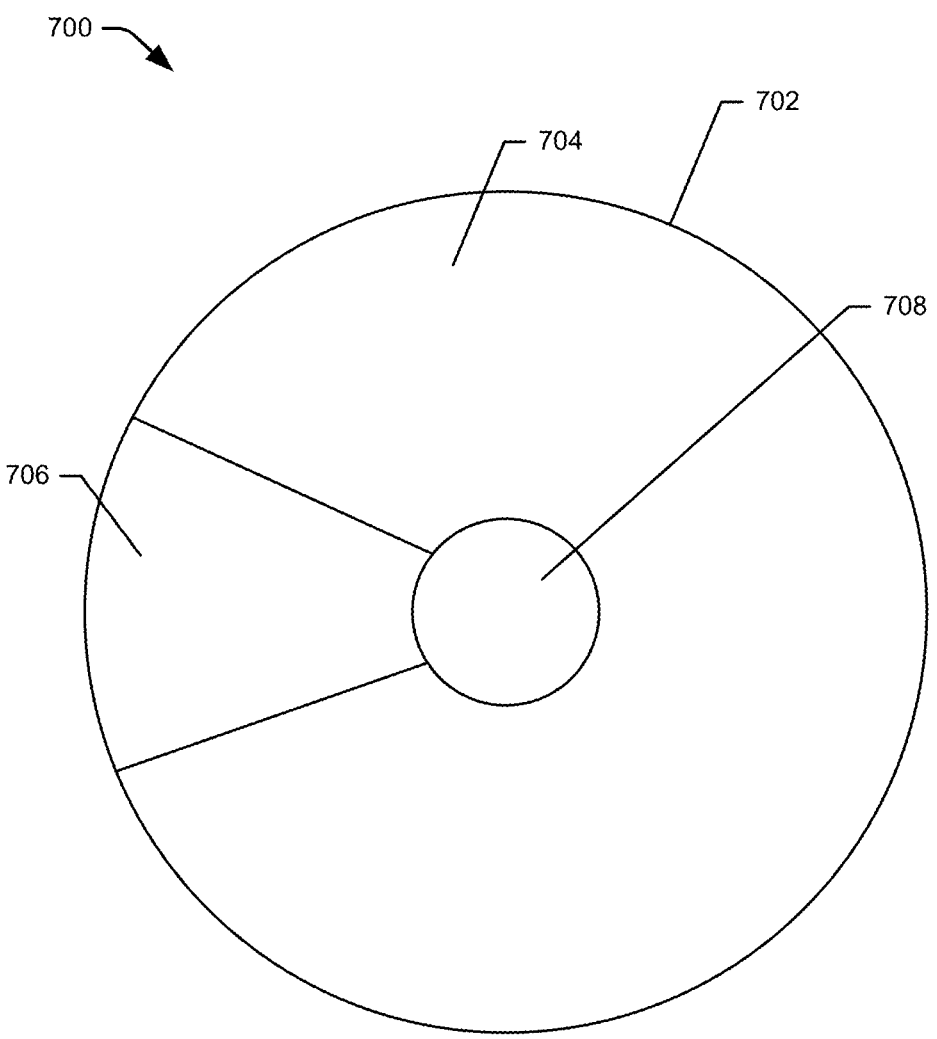
FIG. 7 illustrates a section view of an example housing of an imaging system with a conductive sensor applied to an interior thereof, according to at least one example.

FIG. 7 illustrates a section view of an example housing 700 of an imaging system with a conductive sensor applied to an interior thereof, according to at least one example. The housing 700 may be an example of the housing 216 of FIG. 2. In contrast to FIG. 6, the housing 700 may be formed of a low-conductive shell 702. The low-conductive shell 702 may have a spheroid shape or other shape, though pictured herein as a spherical shape. The low-conductive shell 702 defines an aperture 708 through which the cameras may capture image data of the surroundings. The low-conductive shell 702 is coated with a conductive material 704 such as a conductive paint or adhered conductive material. The conductive material 704 may be applied to only a portion of the low-conductive shell 702, for example to shield a portion of the surroundings from impacting the capacitive sensor. In some examples, the shielded portion 706 may not have any conductive material applied to it, with the capacitive sensor reducing sensitivity in the region of the shielded portion 706. In some examples, a display of the cart 104 may create a large dead field in the capacitive sensor data due to a touchscreen of the display acting as a ground in proximity of the capacitive sensor. In some examples, the capacitive sensor may have reduced coverage in a region adjacent a display, expected user position (e.g., adjacent handlebars), or other areas where electrical grounds or a user is expected to be present. In other embodiments, the conductive paint or flex are design with cutout to control coverage in one direction and lack of coverage in another to avoid shopper false trigger In some examples, the capacitive sensor may have multiple sections or segments rather than a single unibody sensor. For example, in an example of a spherical or spheroid shaped capacitive sensor, the sphere may be divided into quadrants or sections each independently gathering capacitive data. By identifying changes in capacitance over the different quadrants or segments, changes in positions of an item may be identified. For example, the segments may enable identifying a left to right movement of the item from changes in capacitance data of segments of the capacitive sensor arranged left to right. In addition, directionality of movement may be used to identify vertical movement based on changes in capacitance of different segments in various arrangements. The segments or quadrants may be used to identify a direction or movement and thereby activate a camera, light, or other device in the direction of the item in some examples. In some further examples, the quadrants or segments may be used to identify gestures or interactions from a user. In such examples, the capacitive sensor may not only identify an item presented to the sensor and therefore brought to the cart but may also identify gesture-based interactions from a user. For example, a user may interact with a display of the cart 104 through gestures by moving their hands from left to right or up and down to change between screens, move closer for a zoom, or otherwise interact with the display of the cart.

Figure 8:
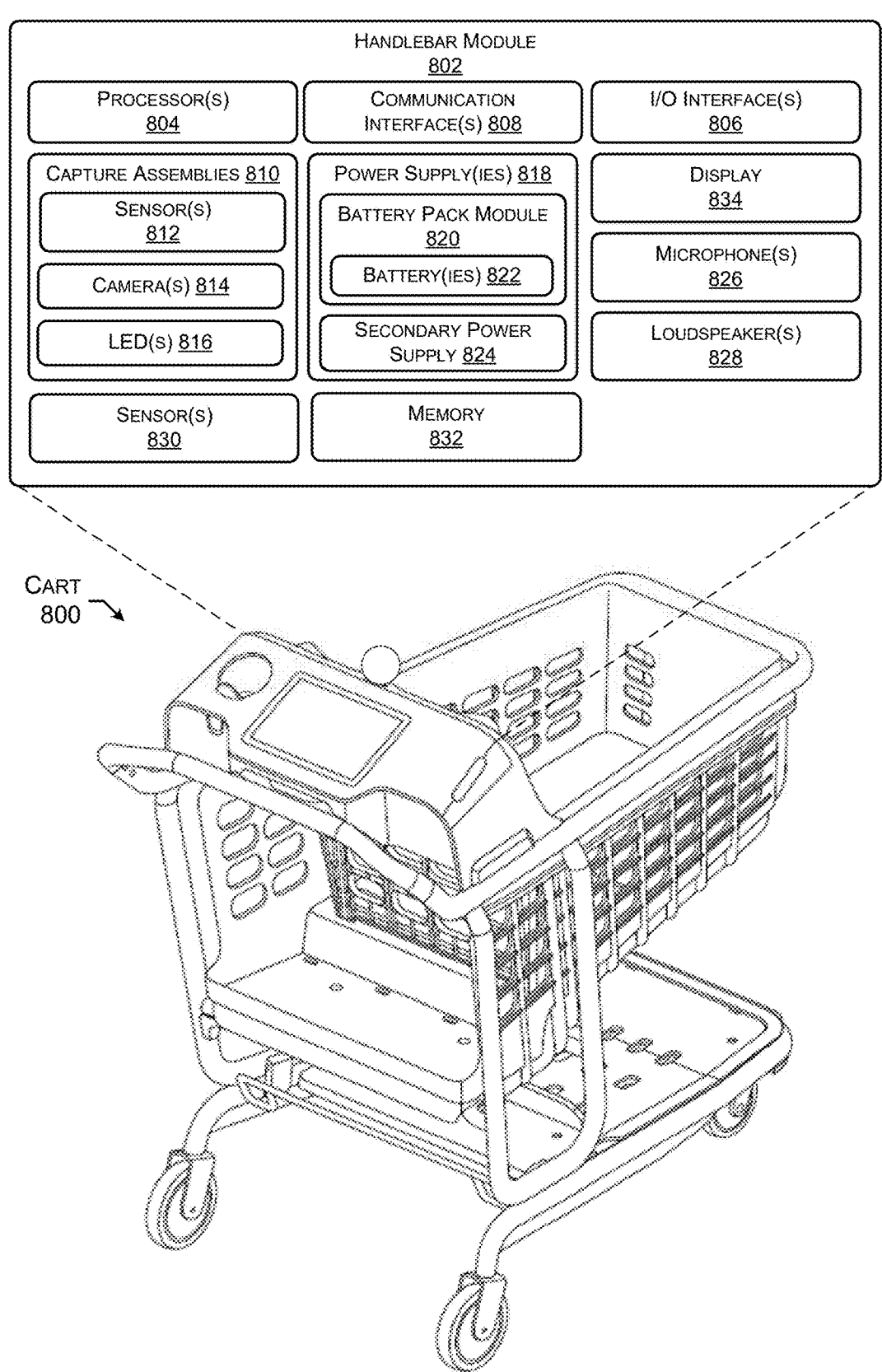
FIG. 8 illustrates an example of components of a handle-bar module, in accordance with examples of the present disclosure.

FIG. 8 illustrates example components of a handlebar module 802 configured to support at least a portion of the functionality of an item management system. The handlebar module 802 may include one or more hardware processors 804 (processors) configured to execute one or more stored instructions. The processor(s) 804 may comprise one or more cores. The handlebar module 802 may include one or more input/output (I/O) interface(s) 806 to allow the processor(s) 804 or other portions of the handlebar module 802 to communicate with other devices. The I/O interface(s) 806 may comprise Inter-Integrated Circuit (I2C), Serial Peripheral Interface bus (SPI), Universal Serial Bus (USB) as promulgated by the USB Implementers Forum, and so forth. The I/O interface(s) 806 may allow the various modules/components to communicate with each other and/or control each other.

The handlebar module 802 may also include one or more communication interfaces 808. The communication interface(s) 808 are configured to provide communications between the handlebar module 802 and other devices, such as the server(s), sensors, interface devices, routers, and so forth. The communication interface(s) 808 may include devices configured to couple to personal area networks (PANs), wired and wireless local area networks (LANs), wired and wireless wide area networks (WANs), and so forth. For example, the communication interfaces 808 may include devices compatible with Ethernet, Wi-Fi™, and so forth. The handlebar module 802 may also include one or more busses or other internal communications hardware or software that allow for the transfer of data between the various modules and components of the handlebar module 802.

The handlebar module 802 may also include the one or more capture assemblies 810 that each include one or more sensors 812 (including the capacitive sensor), a camera 814, and one or more LEDs 816. In some examples, the sensor(s) 812 may comprise any type of sensor that is able to detect the presence of nearby objects without the need for physical contact (e.g., ToF sensor(s), PIR sensor(s), capacitive sensor(s), etc.). The cameras 814 in each of the capture assemblies 810 may comprise any type of camera or imaging device configured to generate image data (and/or video data), or information descriptive of a plurality of picture elements or pixels. The LED(s) 816 may be selectively activated to emit light at any wavelength, visible or non-visible to users.

The handlebar module 802 may include one or more power supply(ies) 818 to provide power to the components of the handlebar module 802, such as a battery pack module 820, which include one or more batteries 822. The power supply(ies) 818 may also include a secondary (e.g., internal) power supply 824 to allow for hot swapping of battery pack modules 820, such as one or more capacitors, internal batteries, etc.

The handlebar module 802 may also include the display/touch 834 (e.g., display 136) configured to display content represented by image data, such as pictures, videos, user interface elements, and/or any other image data. The display 834 may comprise any type of display 834 and may further be a touch screen to receive touch input from a user. The handlebar module 802 may also include one or more microphones 826 and one or more loudspeakers 828 to facilitate a dialogue with a user, and/or to receive feedback from the user. The microphone(s) 826 may capture sound representing the user's speech, and the loudspeaker(s) 828 may output machine-generated words to facilitate a dialogue, prompt a user for feedback on an item and/or for other information, and/or output other alerts or notifications. The handlebar module 802 may also include other types of sensor(s) 830. As described herein, these sensor(s) may proximity sensor(s), light sensor(s), and/or the like.

The handlebar module 802 may include one or more memories 832 (e.g., in an electronics box module along with the processor(s) 804). The memory 832 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 832 provides storage of computer-readable instructions, data structures, program modules, and other data for the operation of the handlebar module 802.

Figure 9:
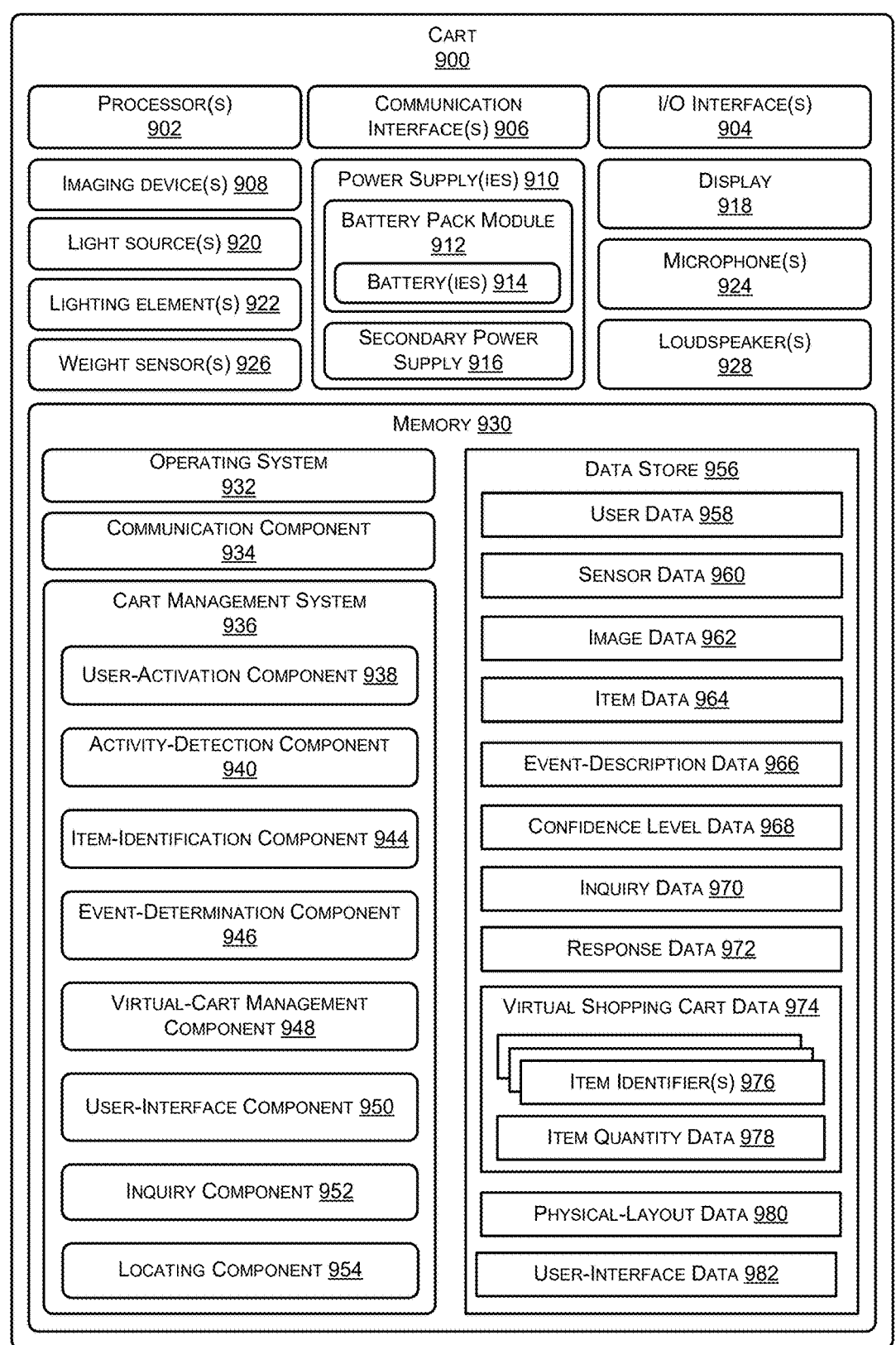
FIG. 9 illustrates example components of the mobile apparatus configured to support at least a portion of functionality of an item management system, in accordance with examples of the present disclosure.

FIG. 9 illustrates example components of an item-identifying cart 900 (e.g., cart 104) configured to support at least a portion of the functionality of a cart management system.

The cart 900 may include one or more hardware processors 902 (processors) configured to execute one or more stored instructions. The processors 902 may comprise one or more cores. The cart 900 may include one or more input/output (I/O) interface(s) 904 to allow the processor 902 or other portions of the cart 900 to communicate with other devices. The I/O interfaces 904 may comprise Inter-Integrated Circuit (I2C), Serial Peripheral Interface bus (SPI), Universal Serial Bus (USB) as promulgated by the USB Implementers Forum, and so forth. The I/O interfaces 904 may allow the various modules/components to communicate with each other and/or control each other.

The cart 900 may also include one or more communication interfaces 906. The communication interfaces 906 are configured to provide communications between the cart 900 and other devices, such as the server(s) 120, sensors, interface devices, routers, and so forth. The communication interfaces 906 may include devices configured to couple to personal area networks (PANs), wired and wireless local area networks (LANs), wired and wireless wide area networks (WANs), and so forth. For example, the communication interfaces 906 may include devices compatible with Ethernet, Wi-Fi™, and so forth. The cart 900 may also include one or more busses or other internal communications hardware or software that allow for the transfer of data between the various modules and components of the cart 900.

The cart 900 may also include the imaging system 134 as imaging device(s) 908. The cart 900 may further include the lighting elements 140 (lighting element(s) 922), and the weight sensors 206 (weight sensor(s) 926) described above. In some instances, the cart 900 further includes include one or more proximity sensors, comprising any type of sensor that is able to detect the presence of nearby objects without the need for physical contact (e.g., capacitive sensor, ToF sensors, PIR sensors, etc.). The imaging system, meanwhile, may comprise any type of camera or imaging device configured to generate image data (and/or video data) or information descriptive of a plurality of picture elements or pixels. Additionally, the imaging system 134 is outward-facing and generates image data representing the facility 102 around the cart 900.

The cart 900 may include one or more power supply(ies) 910 to provide power to the components of the cart 900, such as the battery pack module 138. The power supply(ies) 910 may also include a secondary (e.g., internal) power supply to allow for hot swapping of battery pack modules 138, such as one or more capacitors, internal batteries, etc.

The cart 900 may also include a display 136 configured to display image data, such as pictures, videos, user interface elements, and/or any other image data. The display 136 may comprise any type of display 136 and may further be a touch screen to receive touch input from a user 108. The cart 900 may also include one or more microphones 924 and one or more loudspeakers 928 to facilitate a dialogue with a user 108, and/or to receive feedback from the user 108. The microphone(s) 924 may capture sound representing the user's speech, and the loudspeaker(s) 928 may output machine-generated words to facilitate a dialogue, prompt a user 108 for feedback on an item 106 and/or for other information, and/or output other alerts or notifications.

The cart 900 may include one or more memories 930 (e.g., in an electronics box module along with the processor(s) 902). The memory 930 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 930 provides storage of computer-readable instructions, data structures, program modules, and other data for the operation of the cart 900. A few example functional modules are shown stored in the memory 930, although the same functionality may alternatively be implemented in hardware, firmware, or as a system on a chip (SOC).

The memory 930 may include at least one operating system (OS) component 932. The OS component 932 is configured to manage hardware resource devices such as the I/O interfaces 904, the communication interfaces 906, and provide various services to applications or components executing on the processors 902. The OS component 932 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 930. These components may be executed as foreground applications, background tasks, daemons, and so forth. A communication component 934 may be configured to establish communications with one or more of the sensors, one or more of the servers 120, or other devices. The communications may be authenticated, encrypted, and so forth.

The memory 930 may further store a cart management system 936. The cart management system 936 is configured to provide the item-identifying functions (and other functions) provided by the cart 900 as described herein. For example, the cart management system 936 may be configured to identify a user operating a cart, identify items 106 placed into the cart, identify events surrounding the cart 900, and maintain a virtual shopping cart for a user 108 of the cart 900. While these components are described as operating on the cart 900, in some instances some or all of these components reside additionally or alternatively on the servers 120 or elsewhere.

The cart management system 936 may include a user-activation component 938 that performs operations for activating a shopping session using a cart 900 on behalf of a user 108. For instance, a user 108 may have previously registered for a user account with an operator of the facility to utilize various automated management services provided by an operator of the facility 102. The user 108 may have registered for a user account, such as by providing user data 958, to automate payments made for items taken by the user and included a payment means (e.g., credit card, bank account number, etc.), and may have also provided an identification means in the user data 958 to the user-activation component 938 such that the cart 900 can recognize the user 108. For instance, the user 108 may have registered to identify themselves to the cart 900 using any identification technique by the user-activation component 938, such as by providing user data 958 by presenting an identification means to the imaging system 134 (e.g., presenting a driver's license, presenting a facility-issued card, presenting a user identifier via a mobile phone, etc.), speaking a predefined utterance that is captured by the microphone(s) 924 (e.g., a name of the user, a predefined keyword, etc.), and/or looking into the imaging system 134 for facial recognition. Once a user 108 has identified themselves to using the user-activation component 938, the user-activation component 938 may open a shopping session where the cart 900 identifies and track items 106 retrieved by the user 108 and placed in the cart 900 as well as user interaction in the environment of the facility.

The cart management system 936 may additionally include an activity-detection component 940 configured to detect items 106 (or objects) within a particular proximity to the cart. For example, one or more proximity sensor(s) (if present) may generate sensor data 960 that indicates a distance between the proximity sensor(s) and any objects located in the FOV of the proximity sensor(s). The activity-detection component 940 may analyze the sensor data 960 and determine if an object is within a threshold distance indicating that the object is near the cart 900 and/or within or near the perimeter of the top of the basket 126 of the cart 900 (e.g., one foot from the proximity sensor(s), two feet from the proximity sensor(s), etc.). In this way, the proximity sensor(s) may generate sensor data 960 that indicates whether or not an item 106 is being moved in or out of the basket 126 of the cart 900. However, in some examples, rather than using sensor data 960 generated by a proximity sensor(s), the activity detection component 940 may utilize image data 962 generated by the imaging system 134 to determine if an object is within a threshold distance from the cart 900.

The cart management system 936 may also include an item-identification component 944 configured to analyze image data 962 to identify an item 106 represented in the image data 962. The image data 962 may comprise information descriptive of a plurality of picture elements, or pixels, for one or more image frames (e.g., a still picture, multiple picture frames, video frames, etc.). The item-identification component 944 may analyze the image data 962 using various image processing techniques, or computer vision techniques. For instance, the item-identification component 944 may extract a representation of an item 106 depicted in the image data 962 generated by the imaging system 134. The representation may include identifying text printed on the item 106, colors or color schemes printed in the item, determining 2-D and/or 3D shapes of the items 106, and/or other techniques for extract a representation of the item 106. In some instances, the representation of the item 106 depicted in the image data 962 may comprise a numeric representation, such as a feature vector or a set of feature vectors.

In some examples, a data store 956 stored in the memory 930 may include item data 964, which may include representations of the items 106 offered for acquisition at the facility 102. The item-identification component 944 may compare the extracted represented of the item 106 with the "gallery" or stored representations of the known items 106 in the item data 964. In some instance, the item representation may include an indication of a barcode or SKU data for the item 106 as recognized in, or extracted from, the image data 962. The item-identification component 944 may determine confidence level data 968 based on the comparisons with item representation in the item data 964. The item-identification component 944 may determine, and assign, confidence levels indicating how likely it is that the item 106 represented in the image data 962 corresponds to an item from the item gallery in the item data 964. Based on the confidence level data 968, the item-identification component 944 may determine an item identifier 976 for the item in the image data 962 (or multiple item identifiers 976) that corresponds to an item in the item data 964 to which the item 106 corresponds.

In some examples, the data store 956 may include physical-layout data 980 that is used by the item-identification component 944 to determine the item 106. The physical-layout data 980 may include or provide a mapping of physical locations within the physical layout of devices and objects such that the location of the cart 900 may be utilized to determine an item 106 stored nearby. The physical-layout data 980 may indicate the coordinates within the facility 102 of an inventory location 112, items 106 stored at that inventory location 112, and so forth. In examples where the cart 900 has location determining sensors (e.g., GPS, RFID, proximity, etc.), the location sensor data may be used to determine where in the store the user 108 is. In such examples, the item-identification component 944 may access the physical-layout data 980 to determine if a location associated with the event is associated with items 106, and confidence levels for the corresponding representations of items in the item data 964. Continuing the example above, given the location within the facility 102 of the event and image camera data, the physical-layout data 980 may determine the items 106 that may have been represented in generated images of the event 110.

The cart management system 936 may further include an event-determination component 946 to determine event-description data 966 for the item 106 in the image data 962. The event-determination component 946 may determine if the user 108 is adding an item 106 to the cart 900, removing the item from the cart 900, or other events as described herein etc., based on movement of the item 106 and/or whether the item is shown in the image data 962. For instance, if the item 106 is shown as being moved downward towards the interior of the cart 900, and the user's hand 108 then leaves the basket without the item, 106 it can be determined that the user 108 added the item 106 to the cart 900. Similarly, if the user's hand 108 moves into the cart without an item 106 and is depicted in the image data 962 taking an item 106 from the cart, the event-determination component 946 may determine that the user 108 removed an item 106 from the cart 900. Similarly, if the user 108 interacts with an item on a shelf or location in the environment, the event-determination component may determine that the user 108 has selected an item and may likewise determine when an item is returned to the shelf.

The cart management system 936 may also include a virtual-cart management component 948 configured to manage virtual shopping cart data 974 for the cart 900. For instance, the virtual-cart management component 948 may utilize the item data 964, event-description data 966, and confidence level data 968 to add item identifier(s) 976 to the virtual shopping cart data 974 for items 106 that were added to the cart 900, remove item identifier(s) 976 from the virtual shopping cart data 974 for items 106 that were removed from the cart 900, and track item quantity data 1078 indicating quantities of particular items 106 in the cart 900.

The cart management system 936 may further include a user-interface component 950 configured to present user interfaces on the display 136 based on user-interface data 982. The user interfaces 982 may include one or more fields to present data, and/or receive touch input (or other input via a keyboard, mouse, etc.) from a user 108. For instance, if the item-identification component 944 is unable to determine an item identifier 976 for an item 106 shown in the image data 962, the user-interface component 950 may receive inquiry data 970 generated by an inquiry component 952 to prompt a user 108 for feedback to help identify the item 106, and/or other information (e.g., if multiple items were placed in the cart 900). The inquiry component 952 may be configured to generate inquiry data 970 based on the information needed to identify the item 106. For instance, the inquiry data 970 may include a prompt to request particular feedback from the user 108, such as to provide input (e.g., touch input, vocal/utterance input, etc.) to identify the item 106, input to indicate how many items 106 were added to the cart, input to indicate whether an item 106 was removed or added, etc. In some examples, the user-interface component 950 may present one or more images depicting items from the item data 964 that have the highest confidence levels as corresponding tot eh item 106 in the image data 962, but confidence levels that are not high enough to make a final decision as to the item 106. For instance, the user-interface component 950 may present pictures of two different items that have high confidence levels 968 and request that the user 108 select or indicate the appropriate item 106. Additionally, or alternatively, the user-interface component 950 may present user-interface data 982 that prompts the user for feedback regarding whether or not the item 106 was added to or removed from the cart 900.

In some examples, the cart management system 936 may further include a locating component 954 configured to determine locations of the cart 900 in the facility 102. For instance, the locating component 954 may analyze sensor data 960 collected by sensors of the cart 900 to determine a location. In some examples, the communication interface(s) 906 may include network interfaces that configured the cart 900 to receive or detect wireless signals (e.g., WiFi signals, Bluetooth signals, etc.) and generate sensor data 960 indicative of the signals. The locating component 954 may analyze the sensor data 960 using various techniques to identify the location of the cart 900, such as WiFi triangulation, received signal strength indicators (RSSI), and/or other methods for analyzing wireless signals to determine a location of the cart 900. In some instances, the facility 102 may include various infrared (IR) or near-IR emitters at different locations that emit light according to frequencies, patterns, etc. that indicate the different locations in the facility 102. In such examples, the cart 900 may include a light sensor to generate the sensor data 960 representing the IR or NIR and determine the location of the cart 900 in the facility. In some instances, there may be visible landmarks or markers throughout the facility that indicate a location in the facility, and the locating component 954 may analyze image data 962 generated by an outward facing camera to determine a location of the cart 900. As another example, there may be various radio frequency (RF) emitters positioned throughout the store, and the cart 900 may include an RF receiver to allow the locating component 954 to perform IR beaconing to determine the location of the cart 900. The locating component 954 may perform one, or any combination, of the above techniques to determine a location of the cart 900 in the facility and/or any other technique known in the art.

The locating component 954 may perform various operations based on determining the location of the cart 900 within the facility 102. For instance, the locating component 954 may cause user interface data 982 to be presented on the display 136 that includes a map of the facility 102 and/or directions to an item 106 for the user of the cart 900. Additionally, or alternatively, the locating component 954 may utilize the location of the cart, the physical-layout data 980, and/or item data 964 and "push" user interfaces to the display 136 that indicate various location-based information, such as indications of deals for items 106 located nearby, indications of items 106 located nearby and on the user's shopping list, and/or other user interface data 982.

Figure 10:
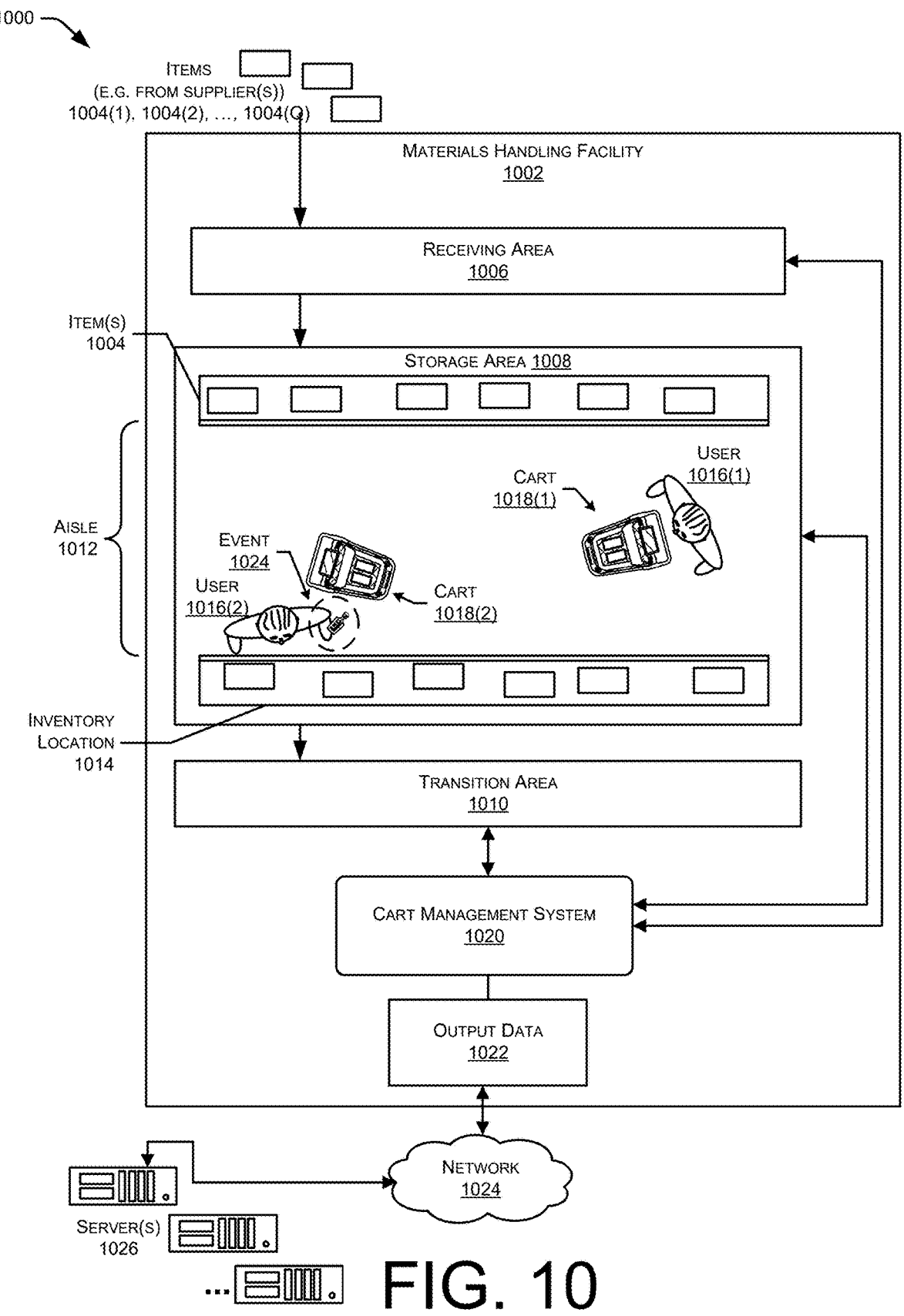
FIG. 10 is a block diagram of an example materials handling facility that includes item-identifying carts and a cart management system configured to generate output regarding events occurring in the cart using sensor data, according to at least one example.

FIG. 10 is a block diagram 1000 of an example materials handling facility 1002 (also referred to the "facility 1002") that includes carts and an item management system configured to generate output regarding events occurring in the cart using sensor data. However, the following description is merely one illustrative example of an industry and environment in which the techniques described herein may be utilized.

An example of the facility 1002 configured to store and manage inventory items is illustrated in FIG. 10. The facility 1002 comprises one or more physical structures or areas within which one or more items 1004(1), 1004(2), . . . , 1004(Q) (generally denoted as 1004) may be held. As used in this disclosure, letters in parenthesis such as "(Q)" indicate an integer result. The items 1004 comprise physical goods, such as books, pharmaceuticals, repair parts, electronic gear, groceries, and so forth.

The facility 1002 may include one or more areas designated for different functions with regard to inventory handling. In this illustration, the facility 1002 includes a receiving area 1006, a storage area 1008, and a transition area 1010. The receiving area 1006 may be configured to accept items 1004, such as from suppliers, for intake into the facility 1002. For example, the receiving area 1006 may include a loading dock at which trucks or other freight conveyances unload the items 1004.

The storage area 1008 is configured to store the items 1004. The storage area 1008 may be arranged in various physical configurations. In one example, the storage area 1008 may include one or more aisles 1012. The aisles 1012 may be configured with, or defined by, inventory locations 1014 on one or both sides of the aisle 1012. The inventory locations 1014 may include one or more of shelves, racks, cases, cabinets, bins, floor locations, or other suitable storage mechanisms for holding or storing the items 1004. The inventory locations 1014 may be affixed to the floor or another portion of the facility's structure or may be movable such that the arrangements of aisles 1012 may be reconfigurable. In some examples, the inventory locations 1014 may be configured to move independently of an outside operator. For example, the inventory locations 1014 may comprise a rack with a power source and a motor, operable by a computing device to allow the rack to move from one location within the facility 1002 to another.

One or more users 1016(1), . . . , 1016(U), carts 1018(1), . . . , 1018(T) (generally denoted as 1018) or other material handling apparatus may move within the facility 1002. For example, the users 1016 may move about within the facility 1002 to pick or place the items 1004 in various inventory locations 1014, placing them on the carts 1018 for ease of transport. An individual cart 1018 is configured to carry or otherwise transport one or more items 1004. For example, a cart 1018 may include a basket, a cart, a bag, and so forth. In other examples, other agencies such as robots, forklifts, cranes, aerial drones, and so forth, may move about the facility 1002 picking, placing, or otherwise moving the items 1004.

One or more sensors may be configured to acquire information in the facility 1002. The sensors in the facility 1002 may include sensors fixed in the environment (e.g., ceiling-mounted cameras) or otherwise, such as sensors in the possession of users (e.g., mobile phones, tablets, etc.) or sensors mounted on the carts 1018, such as the image system 134 and the capacitive sensor described herein. The sensors may include, but are not limited to, cameras, weight sensors (e.g., in the bottom of the carts 1018), radio frequency (RF) receivers, temperature sensors, humidity sensors, vibration sensors, NFCs, and so forth. The sensors may be, in some examples, in or on the cart 1018 or another location in the facility 1002. In one example, the bottom of a basket of the carts 1018 may include weight sensors configured to determine a weight of the items 1004 placed thereupon.

During operation of the facility 1002, the sensors may be configured to provide information suitable for identifying the movement of items 1004 or other occurrences within the cart 1018. For example, a series of images acquired by a camera may indicate removal of an item 1004 from a particular cart 1018 by one of the users 1016 and/or placement of the item 1004 on or at least partially within one of the carts 1018.

While the storage area 1008 is depicted as having one or more aisles 1012, inventory locations 1014 storing the items 1004, sensors, and so forth, it is understood that the receiving area 1006, the transition area 1010, or other areas of the facility 1002 may be similarly equipped. Furthermore, the arrangement of the various areas within the facility 1002 is depicted functionally rather than schematically. For example, multiple different receiving areas 1006, storage areas 1008, and transition areas 1010 may be interspersed rather than segregated in the facility 1002.

The carts 1018 and/or the inventory location 1014 may include, or be coupled to, an item management system 1020. The item management system 1020 is configured to identify interactions with and between users 1016, carts 1018, and/or the inventory location 1014, in one or more of the receiving area 1006, the storage area 1008, or the transition area 1010. These interactions may include one or more events 1024. For example, events 1024 may include placing of an item 1004 in a cart 1018, bringing an item 1004 within a threshold distance of a capacitive sensor of cart 1018, returning of an item 1004 from the cart 1018 to an inventory location 1014, placing an item 1004 on the inventory location 1014, removing an item 1004 from the inventory location 1014, and/or any of the other events described herein. Other events 1024 involving users 1016 may include the user 1016 providing authentication information in the facility 1002, using a computing device at the facility 1002 to authenticate identity to the item management system 1020, and so forth.

By determining the occurrence of one or more of the events 1024, the item management system 1020 may generate output data 1022. The output data 1022 comprises information about the event 1024. For example, where the event 1024 comprises an item 1004 being removed from, or placed in, a cart 1018, the output data 1022 may comprise an item identifier indicative of the particular item 1004 that was removed from, or placed in, the cart 1018, a quantity of the item 1004, a user identifier of a user that removed the item 1004, and/or other output data 1022.

The item management system 1020 may use one or more automated systems to generate the output data 1022. For example, an artificial neural network, one or more classifiers, or other automated machine learning techniques may be used to process the sensor data and/or image data from the one or more sensors to generate output data 1022. The automated systems may operate using probabilistic or non-probabilistic techniques. For example, the automated systems may use a Bayesian network. In another example, the automated systems may use support vector machines to generate the output data 1022 or the tentative results. The automated systems may generate confidence level data that provides information indicative of the accuracy or confidence that the output data 1022 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 145%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1004 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1016 may pick an item 1004(1) such as a perfume bottle that is generally cubical in shape from the inventory location 1014. Other items 1004 at nearby inventory locations 1014 may be predominately spherical. Based on the difference in shape (cube vs. sphere) from the adjacent items, and the correspondence in shape with the previously stored image of the perfume bottle item 1004(1) (cubical and cubical), the confidence level that the user 1016 has picked up the perfume bottle item 1004(1) is high.

In some situations, the automated techniques may be unable to generate output data 1022 with a confidence level above a threshold result. For example, the automated techniques may be unable to distinguish which item 1004 in large a group of items a user 1016 has picked up from the inventory location 1014 and placed in the cart 1018. In other situations, it may be desirable to provide human confirmation of the event 1024 or of the accuracy of the output data 1022. For example, some items 1004 may be deemed age restricted such that they are to be handled only by users 1016 above a minimum age threshold.

In instances where human confirmation is desired, sensor data associated with an event 1024 may be processed to generate inquiry data. The inquiry data may include a subset of the sensor data associated with the event 1024. The inquiry data may also include one or more of one or more tentative results as determined by the automated techniques, or supplemental data. The subset of the sensor data may be determined using information about the one or more sensors. The subset of the sensor data may include images that may show the item 1004 being placed in, or removed from, the cart 1018. The subset of the sensor data may also omit images from other cameras that did not have that item 1004 in the field of view. The field of view may comprise a portion of the scene in the cart 1018 that the camera is able to generate sensor/image data about.

Continuing the example, the subset of the sensor data may comprise a video clip acquired by one or more cameras having a field of view that includes the item 1004. The tentative results may comprise the "best guess" as to which items 1004 may have been involved in the event 1024. For example, the tentative results may comprise results determined by the automated system that have a confidence level above a minimum threshold.

The facility 1002 may be configured to receive different kinds of items 1004 from various suppliers and to store them until a customer orders or retrieves one or more of the items 1004. A general flow of items 1004 through the facility 1002 is indicated by the arrows of FIG. 10. Specifically, as illustrated in this example, items 1004 may be received from one or more suppliers, such as manufacturers, distributors, wholesalers, and so forth, at the receiving area 1006. In various examples, the items 1004 may include merchandise, commodities, perishables, or any suitable type of item 1004, depending on the nature of the enterprise that operates the facility 1002. The receiving of the items 1004 may comprise one or more events 1024 for which the item management system 1020 may generate output data 1022.

Upon being received from a supplier at receiving area 1006, the items 1004 may be prepared for storage. For example, items 1004 may be unpacked or otherwise rearranged. An inventory management system of the facility 1002 may include one or more software applications executing on a computer system to provide inventory management functions based on the events 1024 associated with the unpacking or rearrangement. These inventory management functions may include maintaining information indicative of the type, quantity, condition, cost, location, weight, or any other suitable parameters with respect to the items 1004. The items 1004 may be stocked, managed, or dispensed in terms of countable, individual units or multiples, such as packages, cartons, crates, pallets, or other suitable aggregations. Alternatively, some items 1004, such as bulk products, commodities, and so forth, may be stored in continuous or arbitrarily divisible amounts that may not be inherently organized into countable units. Such items 1004 may be managed in terms of measurable quantity such as units of length, area, volume, weight, time, duration, or other dimensional properties characterized by units of measurement. Generally speaking, a quantity of an item 1004 may refer to either a countable number of individual or aggregate units of an item 1004 or a measurable amount of an item 1004, as appropriate.

After arriving through the receiving area 1006, items 1004 may be stored within the storage area 1008. In some examples, like items 1004 may be stored or displayed together in the inventory locations 1014 such as in bins, on shelves, hanging from pegboards, and so forth. In this example, all items 1004 of a given kind are stored in one inventory location 1014. In other examples, like items 1004 may be stored in different inventory locations 1014. For example, to optimize retrieval of certain items 1004 having frequent turnover within a large physical facility 1002, those items 1004 may be stored in several different inventory locations 1014 to reduce congestion that might occur at a single inventory location 1014.

When a customer order specifying one or more items 1004 is received, or as a user 1016 progresses through the facility 1002, the corresponding items 1004 may be selected or "picked" from the inventory locations 1014 containing those items 1004. In various examples, item picking may range from manual to completely automated picking. For example, in one example, a user 1016 may have a list of items 1004 they desire and may progress through the facility 1002 picking items 1004 from inventory locations 1014 within the storage area 1008 and placing those items 1004 into a cart 1018. In other examples, employees of the facility 1002 may pick items 1004 using written or electronic pick lists derived from customer orders. These picked items 1004 may be placed into the cart 1018 as the employee progresses through the facility 1002. Picking may comprise one or more events 1024, such as the user 1016 in moving to the inventory location 1014, retrieval of the item 1004 from the inventory location 1014, and so forth.

After items 1004 have been picked, they may be processed at a transition area 1010. The transition area 1010 may be any designated area within the facility 1002 where items 1004 are transitioned from one location to another or from one entity to another. For example, the transition area

1010 may be a packing station within the facility 1002. When the item 1004 arrives at the transition area 1010, the items 1004 may be transitioned from the storage area 1008 to the packing station. Information about the transition may be maintained by the item management system 1020 using the output data 1022 associated with those events 1024.

In another example, if the items 1004 are departing the facility 1002 a list of the items 1004 may be used by the item management system 1020 to transition responsibility for, or custody of, the items 1004 from the facility 1002 to another entity. For example, a carrier may accept the items 1004 for transport with that carrier accepting responsibility for the items 1004 indicated in the list. In another example, a customer may purchase or rent the items 1004 and remove the items 1004 from the facility 1002.

The item management system 1020 may access or generate sensor data about the items 1004, the users 1016, the carts 1018, and so forth. The sensor data may be acquired by one or more of the sensors, data provided by other systems, and so forth. For example, the sensors may include cameras configured to acquire image data of items 1004 placed in the carts 1018. The image data may comprise still images, video, or a combination thereof. The image data may be processed by the item management system 1020 to determine an item identifier for the items 1004, a listing of items in the cart 1018 for a user 1016, and so forth. As used herein, the identity of the user of a cart 1018 may represent a unique identifier of the user (e.g., name, number associated with user, username, etc.), an identifier that distinguishes the user amongst other users being identified with the environment, or the like.

The item management system 1020, or systems coupled thereto, may be configured to identify the user 1016. In one example, this determination may comprise comparing sensor data with previously stored identity data. For example, the user 1016 may be identified by showing their face to a facial recognition system, by presenting a token carrying authentication credentials, providing a fingerprint, scanning a barcode or other type of unique identifier upon entering the facility, and so forth. Identity of the user 1016 may be determined before, during, or after entry to the facility 1002 and/or interaction with a cart 1018. Determination of the user's 1016 identity may comprise comparing sensor data associated with the user 1016 in the facility 1002 and/or with the cart 1018 to previously stored user data. In some examples, the output data 1022 may be transmitted over a network 1026 to server(s) 1028.

Figure 11:
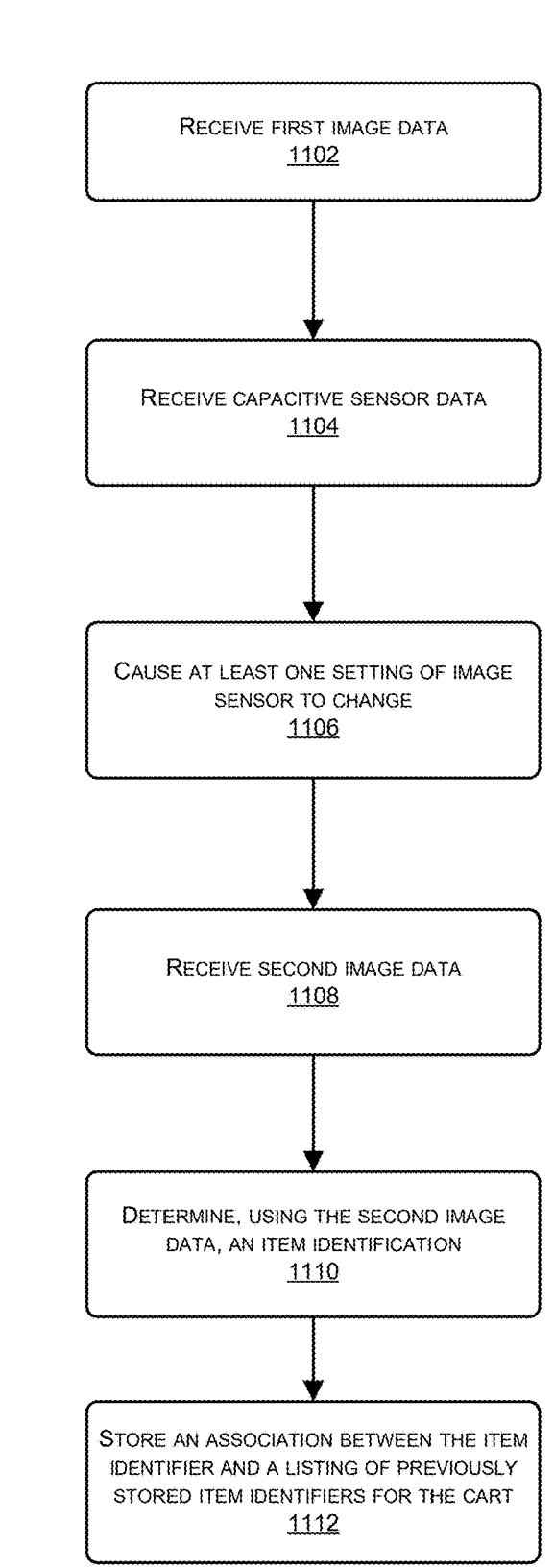
FIG. 11 illustrates a flow diagram of an example process for identifying items brought near a cart using a capacitive sensor, according to at least one example.

FIG. 11 depicts a logical flow diagram for processes that may be carried out using the systems described herein. In some examples, the steps depicted may be implemented in software executed by a processor, such as a processor of a cart 104 or of a server 120, or other computing device. Though the logical flow diagrams are shown in a particular order, the order of the processes may be different in some examples. The process 1100 as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, some or all of the process 1100 may be performed locally on the carts as described herein, and some or all of the processes may be performed at a remote computing system, such as a cloud computing system with which the carts are in network communication.

FIG. 11 illustrates a flow diagram of an example process 1100 for identifying items brought near a cart using a capacitive sensor, according to at least one example. At 1102, the processor of a cart 104, such as processor 804, may receive first image data 1102 generated by a first imaging device. The first imaging device may be operating at a first operating setting, such as a first resolution, focal length, low-power mode, or other such setting. The image data may be gathered by the imaging system 134. In some examples, the image data may also include image data gathered from additional image systems, such as image systems built in to the facility, such as image systems attached to ceilings, shelves, at entrances and exits, and other such image data. Such image data may be used in conjunction with cart image data to identify customer interactions away from the cart as discussed above, such as items of interest before making a selection, or items selected but subsequently returned to a shelf.

At 1104, the process 1100 includes receiving capacitive sensor data. The capacitive sensor data may be part of the imaging system 134 described above. The capacitive sensor data may include data indicative of a change in capacitance as detected at the capacitive sensor. The change in capacitive data may be compared against a threshold rate of change of capacitive data. The threshold may be indicative of an item being brought within a threshold distance of the cart 104.

At 1106, the process 1100 includes the processor causing at least one setting of an image sensor to change. The at least one setting may be changed in response to determining, based on the capacitive sensor data, that an item is brought within a threshold distance of the cart. The at least one setting may be a focal length, a low or high power mode, a resolution, an illumination mode, a flash mode, and other such settings, such as to switch between a first camera and a second camera, the first camera configured to capture image data at a distance from the cart 104 while the second camera may be configured to capture image data at or within the cart 104.

At 1108, the process 1100 includes the processor receiving second image data after changing at least one image sensor at 1106. The image data may be gathered while item is at or near the cart as detected by the capacitive sensor data. The at least one setting of the camera is adjusted prior to receiving the second image data.

At 1110, the process 1100 includes the processor determining, using the image data, and item identification. The item identification may be determined based on an item identifier visible in the image data, such as a QR code, barcode, or other such indicator. In some examples, the processor may identify the item using an image recognition, text recognition, or other such technique on the image data.

At 1112, the process 1100 includes the processor storing an association between the item identifier, such as the item identity, and a listing of items in a virtual cart associated with the user. The virtual cart may be verified in some instances based on a weight sensor that verifies a weight of the item placed in the cart and confirms the item weight matches a reference item weight for the item. The virtual list may be used to process an order for the user when they complete their interactions within the facility.

Separate instances of these programs can be executed on or distributed across any number of separate computer systems. Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:

a housing comprising a capacitive sensor disposed thereon;

an imaging device positioned within the housing and configured to capture image data of an environment surrounding the housing, the imaging device having a first focal length and a second focal length, the first focal length shorter than the second focal length;

one or more processors; and one or more non-transitory computer-readable media storing computer-executable instructions that, when executed, cause the one or more processors to perform acts comprising:

receiving first image data from the imaging device using the first focal length;

receiving capacitive sensor data from the capacitive sensor indicative of a presence of an item within a threshold distance of the imaging device;

causing the imaging device to capture second image data using the second focal length in response the capacitive sensor data;

determining that the second image data includes a representation of an item;

determining an identity of the item based at least in part on the representation of the item; and storing an association between the identity of the item and a user of the system.

2. The system of claim 1, wherein the capacitive sensor comprises a conductive flex applied to an interior or exterior of the housing.

3. The system of claim 1, wherein the one or more non-transitory computer-readable media further store computer-executable instructions that, when executed, cause the one or more processors to perform additional acts comprising:

determining a temperature drift of the capacitive sensor by identifying a change in capacitance data occurring over a period of time greater than a threshold period of time; and resetting the capacitive sensor in response to determining the temperature drift.

4. The system of claim 1, wherein the capacitive sensor is a first capacitive sensor and the capacitive sensor data is first capacitive sensor data, the system further comprises a second capacitive sensor disposed on an exterior of the housing, and the one or more non-transitory computer-readable media further store computer-executable instructions that, when executed, cause the one or more processors to perform additional acts comprising:

receiving second capacitive sensor data from the second capacitive sensor; and determining a difference between the first capacitive sensor data and the second capacitive sensor data, wherein causing the imaging device to capture the second image data is based at least in part on the difference.

5. The system of claim 1, wherein the imaging device is configurable between a first setting and a second setting, the first setting comprising a power saving mode and associated with the first focal length and the second setting comprising an item scanning mode and associated with the second focal length.

6. An imaging system comprising:

a capacitive sensor;

an imaging device configured to operate at least at a first setting and a second setting;

one or more processors; and one or more non-transitory computer-readable media storing computer-executable instructions that, when executed, cause the one or more processors to:

cause the imaging device to operate at the first setting;

determine, based at least in part on capacitive data from the capacitive sensor, that an item is brought within a threshold distance of the imaging system; and cause the imaging device to capture image data at the second setting in response to the item being within the threshold distance.

7. The imaging system of claim 6, wherein the first setting comprises a power saving mode and the second setting comprises an item scanning mode.

8. The imaging system of claim 6, wherein the capacitive sensor is a first capacitive sensor configured to capture first capacitive sensor data, the imaging system further comprises a second capacitive sensor disposed surrounding the first capacitive sensor, and the one or more non-transitory computer-readable media further store computer-executable instructions that, when executed, cause the one or more processors to additionally:

receive second capacitive sensor data from the second capacitive sensor; and determine the capacitive data based on a difference between the first capacitive sensor data and the second capacitive sensor data.

9. The imaging system of claim 6, wherein the one or more non-transitory computer-readable media further store computer-executable instructions that, when executed, cause the one or more processors to additionally:

determine a temperature drift of the capacitive sensor by identifying a change in capacitance data occurring over a period of time greater than a threshold period of time; and reset the capacitive sensor in response to determining the temperature drift.

10. The imaging system of claim 6, wherein the capacitive sensor defines a void adjacent a user interface, the capacitive sensor configured to gather capacitive data in a surrounding region excluding the user interface.

11. The imaging system of claim 6, wherein the computer-executable instructions to determine that the item is brought within the threshold distance comprises determining that a rate of change of the capacitive data exceeds a predetermined threshold.

12. The imaging system of claim 6, wherein the capacitive sensor is disposed on a surface of a housing at least partially enclosing the imaging device.

13. The imaging system of claim 12, wherein the housing is configured to connect to a mobile apparatus or stationary system for performing a checkout process.

14. The imaging system of claim 6, wherein the imaging device comprises an omnidirectional imaging device configured to capture image data representative of a unified view surrounding the imaging system.

15. A method, comprising:

causing an image system to capture first image data at a first setting;

receiving capacitive data from a capacitive sensor coupled to a housing of the image system and comprising a conductive shell;

determining, based on the capacitive data, an item being brought within a threshold distance of the capacitive sensor; and causing the image system to capture second image data at a second setting.

16. The method of claim 15, wherein the first setting comprises a first focal length configured for capturing first image data at a first distance and the second setting comprises a second focal length for capturing second image data at a second distance, the first distance greater than the second distance.

17. The method of claim 15, wherein determining the item being brought within the threshold distance comprises determining that a rate of change of the capacitive data exceeds a predetermined threshold.

18. The method of claim 15, wherein the capacitive data comprises first capacitive data, the method further comprising:

receiving second capacitive data from a second capacitive sensor, the second capacitive sensor disposed within the conductive shell; and determining a difference between the first capacitive data and the second capacitive data, wherein determining the item is brought within the threshold distance is based at least in part on the difference.

19. The method of claim 15, further comprising:

determining a temperature drift of the capacitive sensor by identifying a change in capacitance data occurring over a period of time greater than a threshold period of time; and resetting the capacitive sensor in response to determining the temperature drift.

20. The method of claim 15, further comprising:

operating the image system in a first operating state at a first time prior to determining the item is brought within the threshold distance; and operating the image system in a second operating state at a second time later than the first time, wherein the first operating state comprises a power save mode wherein one or more components of the image system may be disabled.

* * * * *